US006512656B1

(12) United States Patent
Matsumoto et al.

(10) Patent No.: US 6,512,656 B1
(45) Date of Patent: Jan. 28, 2003

(54) RECORDING AND/OR REPRODUCING APPARATUS FOR A MAGNETIC TAPE

(75) Inventors: Masao Matsumoto, Tokyo (JP); Jun Ishikawa, Tokyo (JP); Keiichi Shibata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,022

(22) PCT Filed: Feb. 26, 1999

(86) PCT No.: PCT/JP99/00960

§ 371 (c)(1), (2), (4) Date: Jan. 21, 2000

(87) PCT Pub. No.: WO99/44200

PCT Pub. Date: Sep. 2, 1999

(30) Foreign Application Priority Data

Feb. 26, 1998 (JP) .......................................... 10-046031

(51) Int. Cl.[7] .............................................. G11B 5/008

(52) U.S. Cl. ......................... 360/137; 360/93; 360/96.5

(58) Field of Search ........................... 360/93, 95, 96.5, 360/96.6, 137

(56) References Cited

U.S. PATENT DOCUMENTS 3,684,295 A * 8/1972 Strain et al. .................. 360/93
3,832,734 A * 8/1974 Childress Jr. et al. ..... 360/96.6
4,491,889 A * 1/1985 Tsuchiya .................... 360/105
5,764,433 A * 6/1998 Hanzawa et al. .......... 360/96.6
5,953,182 A * 9/1999 Hanzawa et al. ........... 360/105

FOREIGN PATENT DOCUMENTS

JP 55-014534 * 2/1980
JP 62-042358 * 2/1987

OTHER PUBLICATIONS

Translation of Japanese Document 04–22429.*

* cited by examiner

*Primary Examiner*—William Klimowicz
(74) *Attorney, Agent, or Firm*—Jay H. Maioli

(57) ABSTRACT

A recording and/or reproducing apparatus using a magnetic tape as a recording medium such that, when holding by a holding mechanism is released at the position where a cover member is closed and a magnetic head is moved between a contact position, where contact with a magnetic tape which travels by a traveling mechanism provided in the apparatus body is obtained, to a position distant from the magnetic tape or when the magnetic tape is pinched by the traveling mechanism, the pinching of the magnetic tape by the traveling mechanism is released and the magnetic head is moved to a distant position. In this manner, even if the apparatus is stopped when the power source is shut off while the FWD reproducing mode or the REV reproducing mode is kept set, the magnetic tape can be safely and securely extracted from the attachment section.

15 Claims, 24 Drawing Sheets

RECORDING AND/OR REPRODUCING APPARATUS FOR A MAGNETIC TAPE

TECHNICAL FIELD

The present invention relates to a recording/reproducing apparatus such as a tape recorder using a magnetic tape as a recording medium, and particularly to, a recording and/or reproducing apparatus which releases the traveling state of the magnetic tape and separates the magnetic head apart from the magnetic tape, when hold of a cover member covering the region where the magnetic tape is attached is released.

BACKGROUND ART

Conventionally, a cassette-type tape recorder is used as a recording and/or reproducing apparatus which utilizes a magnetic tape as a recording medium contained in a tape cassette. An example of this tape recorder adopts a FWD (forward) reproducing mode, a REV (reverse) reproducing mode, a FF (force feed) mode, and a REW (rewind) mode. In the FWD reproducing mode, the magnetic tape travels at a constant speed in a first traveling direction in which the magnetic tape travels forward from a tape reel rotatably supported in a cassette half to another tape reel, to reproduce information signals recorded on the magnetic tape. In the REV reproducing mode, the magnetic tape travels at a constant speed in a second traveling direction in which the magnetic tape travels reverse from the latter tape reel to the former tape reel, to reproduce information signals recorded on the magnetic tape. In the FF mode, the magnetic tape travels forward at a high speed to perform force feed of the tape toward the latter tape reel. In the REW mode, the magnetic tape travels in reverse at a high speed and is thus rewound toward the former tape reel. These operation modes can be selected by switching a magnetic tape drive mechanism comprising a magnetic tape traveling mechanism which includes various gears, levers, and the like.

As the magnetic tape drive mechanism for switching and selecting various operation modes of the tape recorder, the structure shown in FIGS. 1 and 2 is employed.

In this magnetic tape drive mechanism, a cam gear 201 rotated and driven by a drive motor not shown is supported on a chassis of the tape recorder, as shown in FIGS. 1 and 2. A continuous cam groove 202 having a predetermined shape is formed in the main surface of the cam gear 201.

The chassis is provided with a mode switch lever 203 such that the mode switch lever is movable in the $X_1$ and $X_2$ directions in FIGS. 1 and 2. This mode switch lever 203 is shifted in the directions of the arrows $X_1$ and $X_2$ by engaging an engage projection 204 provided at an end side with the cam groove 202. The FWD reproducing mode, FF mode, REW, mode, and the REV mode are selected by the mode switch lever 203 when the engage projection 204 stops at the positions for selecting these operation modes, respectively. An acting portion 205 for rotating a rotary lever described later is provided on one side of a middle portion of the mode switch lever 203.

A head base 206 attached with a magnetic head not shown is supported on the chassis of the tape recorder, such the head base is movable in the directions of the arrows $Y_1$ and $Y_2$ in FIGS. 1 and 2, which are perpendicular to the mode switch lever 203 and are directions in which the head base moves close to and apart from the magnetic tape of the tape cassette attached in the cassette attachment portion not shown of the tape recorder. At an intermediate portion of the head base 206, an operation piece 207 is cut and stands to rotate and operate the rotary lever 208. In addition, the head base 206 is moved and energized in the direction of the arrow $Y_2$ in FIGS. 1 and 2, by a spring member not shown.

Also, the chassis is provided with a rotary lever 208 whose rotation fulcrum is at a position deviated to one end side from the center. On the other end side of the rotary lever 208, there is provided a pressure operation piece 209 for pressing and operating the operation piece 207 provided at the head base 206. Further, the rotary lever 208 is provided with a reaction projection 210 opposed to the action portion 205 having a concave shape provided in the mode switch lever 203.

In the magnetic tape drive mechanism thus constructed, the mode switch lever 203 is positioned in the center of the movement range extending from the directions of the arrows $Y_1$ and $Y_2$ in FIGS. 1 and 2, and the head base 206 is situated at the end portion in the direction of the arrow $Y_2$ in the movable range extending from the directions of the arrows $Y_1$ and $Y_2$ in FIGS. 1 and 2. In this situation, the magnetic head attached to the head base 206 is situated at a position apart from the magnetic tape, kept not in contact with the magnetic tape. At this time, the operation piece 207 provided at the head base 206 is kept in contact with the press operation piece 209 of the rotary lever 208, as shown in FIG. 1.

In the magnetic tape drive mechanism, for example, the REW mode shown in FIG. 1 is selected when the cam gear 201 is rotated from the state shown in FIG. 2 such that the mode switch lever 203 is moved in the direction of the arrow $X_2$ in FIG. 2. When the mode switch lever 203 is moved in the direction of the arrow $X_2$ in FIG. 2 in the state in which the REW mode is selected, the reaction projection 210 is engaged with the action portion 205 of the mode switch lever 203, and the action portion 205 is rotated in the clockwise direction in FIG. 1 about the support shaft 208s.

As the rotary lever 208 is thus rotated in the clockwise direction in FIG. 1, the operation piece 207 is pressed by the press operation piece 209, and the head base 206 is moved in the direction of the arrow $Y_1$ in FIG. 1. As the head base 206 is thus moved in the direction of the arrow $Y_1$ in FIG. 1, the magnetic head attached to the head base 206 slides on the magnetic tape traveling at a constant speed, and reproduction of information signals recorded on the magnetic tape is enabled.

In a tape recorder constructed so as to drive the magnetic tape drive mechanism by a drive power source, the magnetic head is left in contact with the magnetic tape if the power source is shut down while the magnetic tape travels at a constant speed and a magnetic head slides on the traveling magnetic tape to record or reproduce information signals with respect to the magnetic tape. Therefore, in case where the tape cassette is extracted out of the tape recorder after the power source is shut off halfway during recording or reproduction, the power must be turned on again to activate the magnetic tape drive mechanism and the magnetic head must be then operated to move apart from the magnetic tape, thus resulting in low operability.

Meanwhile, a portable tape recorder uses a battery as a drive power source and its tape drive mechanism therefore cannot be operated unless the battery is replaced with new one, after the battery becomes empty. Regardless of whether the apparatus is of a portable type or a floor type, in the recording and/or reproducing apparatus using a magnetic tape, a stop of traveling of a magnetic tape during recording or reproduction is not detected as shut-down of the power but is mistaken as a malfunction of the apparatus, so the tape cassette may be forced to be put out by a user without releasing the contact between the magnetic head and the magnetic tape. If the tape cassette is thus taken out with the magnetic head kept in contact with the magnetic tape, not only the magnetic tape but also the tape traveling mechanism and the magnetic head provided in the recording and/or reproducing apparatus side may be damaged.

Hence, it is desirable that the magnetic head is moved apart from the magnetic tape and then the tape cassette is taken out, without turning on the power again, even in case where traveling of the magnetic tape is stopped with the magnetic head kept in contact with the magnetic tape.

In the magnetic tape drive mechanism, however, the action portion 205 of the mode switch lever 203 and the reaction projection 210 of the rotary lever 208 are engaged with each other, and the press operation piece 209 of the rotary lever 208 is in contact with the operation piece 207 of the head base 206 while the engage projection 204 of the mode switch lever 203 is engaged in the cam groove 202 of the cam gear 201, in the situation that the magnetic head is kept in contact with the magnetic tape. Therefore, any of the cam gear 201, mode switch lever 203, rotary lever 208, and head base 206 cannot be operated singly.

Consequently, in the magnetic tape drive mechanism shown in FIGS. 1 and 2, the cam gear 201 must be rotated mechanically to move the head base 206 in the direction of the arrow $Y_2$ in FIGS. 1 and 2 so that the magnetic head is moved apart from the magnetic tape, in order to take out the tape cassette when the power is shut down and traveling of the magnetic tape is stopped halfway while information signals are reproduced from or recorded into the magnetic tape with the magnetic head kept in contact with the magnetic tape.

If respective members constituting the magnetic tape drive mechanism are thus mechanically operated, the respective members must be operated with a force large enough to overcome the force effected by the friction between the members and the spring member and the like which energize the head base to move toward the magnetic tape side. In this case, to prevent the members from being damaged by the large force and to prevent the connection between the members from being released, the strength of each member must be increased or members having high durability must be used, so that increase of the manufacturing cost is involved.

DISCLOSURE OF THE INVENTION

The present invention has an object of providing a recording and/or reproducing apparatus for a magnetic tape, in which a magnetic head is moved apart from the magnetic tape and pinching of the magnetic tape is released by a magnetic tape traveling mechanism, when the magnetic tape attached to an attachment position in the body of the apparatus is detached therefrom, so that the magnetic tape can be extracted while ensuring the protection of the magnetic tape and respective mechanisms in the side of the recording and/or reproducing apparatus.

Another object of the present invention is to provide a recording and/or reproducing apparatus for a magnetic tape, in which the magnetic head is moved apart from the magnetic tape and pinching of the magnetic tape is released by a magnetic tape traveling mechanism, so that the magnetic tape can be extracted from an attachment position in the body of the apparatus, even when traveling of the magnetic tape is stopped while the magnetic head slides on the traveling magnetic tape to record or reproduce information signals.

The present invention has further another object of providing a recording and/or reproducing apparatus for a magnetic tape, in which the magnetic head is moved apart from the magnetic tape and pinching of the magnetic tape is released by a magnetic tape traveling mechanism, so that the magnetic tape can be extracted from an attachment position in the body of the apparatus, when a cover member covering the portion where the magnetic tape is attached is opened.

Also, further another object of the present invention is to provide a recording and/or reproducing apparatus for a magnetic tape, in which the magnetic head is moved apart from the magnetic tape and pinching of the magnetic tape is released by a magnetic tape traveling mechanism, so that the magnetic tape can be extracted from an attachment position in the body of the apparatus, without turning on the power again, even when traveling of the magnetic tape is stopped while the magnetic head slides on the traveling magnetic tape to record or reproduce information signals.

To achieve the objects as described above, the recording and/or reproducing apparatus for a magnetic tape, according to the present invention, includes: an apparatus body to which the magnetic tape is attached; a cover member provided on the apparatus body such that the cover member can be opened/closed to open/close a portion of the apparatus body where the magnetic tape is attached; a hold mechanism for holding the portion of the apparatus body where the magnetic tape is attached, at a closed position; a traveling mechanism provided on the apparatus body, for pinching the magnetic tape and making the pinched magnetic tape travel; a magnetic head provided on the apparatus body, to be moved between a contact position where the magnetic head is in contact with the magnetic tape and a distant position which is distant from the magnetic tape; and a switch mechanism for releasing pinching of the magnetic tape by the traveling mechanism and for moving the magnetic head to the distant position, when holding of the cover member at the closed position by the holding mechanism is released in a state where the magnetic head is at the contact position or in a state where the magnetic tape is pinched by the traveling mechanism.

The recording and/or reproducing apparatus according to the present invention further includes a release operation section for releasing holding of the cover member by the holding mechanism. Further, the switch mechanism releases the holding of the magnetic tape by the traveling mechanism and moves the magnetic head to the distant position, in such a manner in which the switch mechanism is operated through the release operation section.

The recording and/or reproducing apparatus according to the present invention further includes a plurality of operation sections for switching a traveling state of the magnetic tape and a recording or reproducing state of the magnetic tape by the magnetic tape. Further, the switch mechanism moves the magnetic head to the contact position or the distant position and switches the traveling mechanism into a state in which the magnetic tape is pinched, in such a manner in which any of the plurality of operation sections is operated.

The recording and/or reproducing apparatus further includes a motor started in such a manner in which the operation sections are operated. The switch mechanism further includes a mode switch lever moved and operated, based on a drive force from the motor, and the magnetic head and the traveling mechanism are operated by the mode switch lever.

The traveling mechanism includes at least one capstan, and a pinch roller for pinching, together with the capstan, the magnetic tape and for making the magnetic tape travel, and the switch mechanism releases the pinching of the magnetic tape by the pinch roller together with the capstan. The switch mechanism includes a first movement operation section for moving the magnetic head between the contact position and the distant position by the mode switch lever, and a second movement operation section for moving the pinch roller to a position where the pinch roller together with the capstan pinches the magnetic tape.

Further, the recording and/or reproducing apparatus according to the present invention comprises a pair of reel bases, a detection switch for detecting a position of the mode switch lever, and a drive mechanism for driving either one of the pair of reel bases, based on the drive force of the motor, wherein based on a detection result of the detection switch, a rotation direction of the motor is switched thereby to switch the one of the reel bases driven by the drive mechanism.

The other objects than those described above and specific advantages obtained by the present invention will be understood more clearly from the explanation to the embodiments described below.

BRIEF DESCRIPTION OF THE DRAWINGS

FIG. 26 is a plan view showing a state where the FWD reproducing mode is settled.

FIG. 27 is a plan view showing a state where forced release is performed by the lock base where the FWD reproducing mode is settled.

FIG. 28 is a plan view showing a state where the REV reproducing mode is settled.

FIG. 29 is a plan view showing a state where forced release is performed by the lock base where the REV reproducing mode is settled.

FIG. 30 is a plan view showing a state where respective members are returned to original positions after forced release is performed where the REV reproducing mode is settled.

BEST MODE FOR CARRYING OUT THE INVENTION

In the following, specific embodiments of the apparatus for recording and/or reproducing a magnetic tape, according to the present invention, will be explained with reference to the drawings.

Note that the embodiments below are each applied to a portable cassette-type tape player with a so-called automatic reverse reproduction function by which normal reproduction and reverse reproduction are continuously performed. In the normal reproduction, the magnetic tape travels at a constant speed in the forward direction to reproduce information signals recorded on the magnetic tape. In the reverse reproduction, the magnetic tape travels at a constant speed in the reverse direction to reproduce information signals recorded on the magnetic tape.

Figure 3:
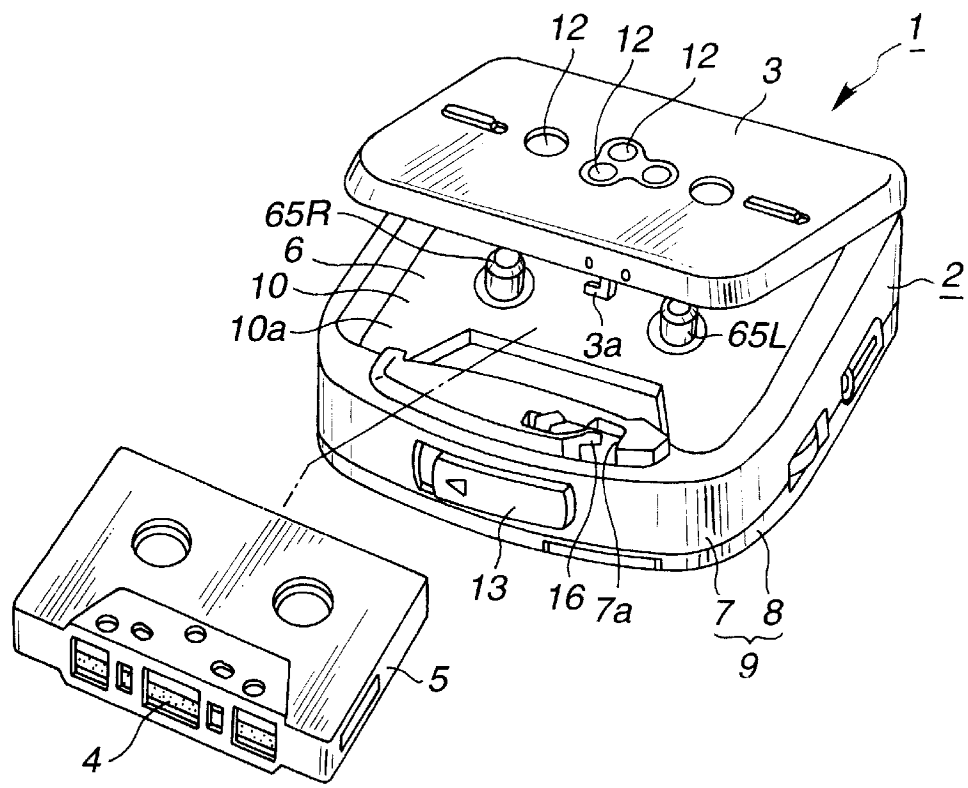
FIG. 3 is a perspective view showing a tape player according to the present invention.
Figure 5:
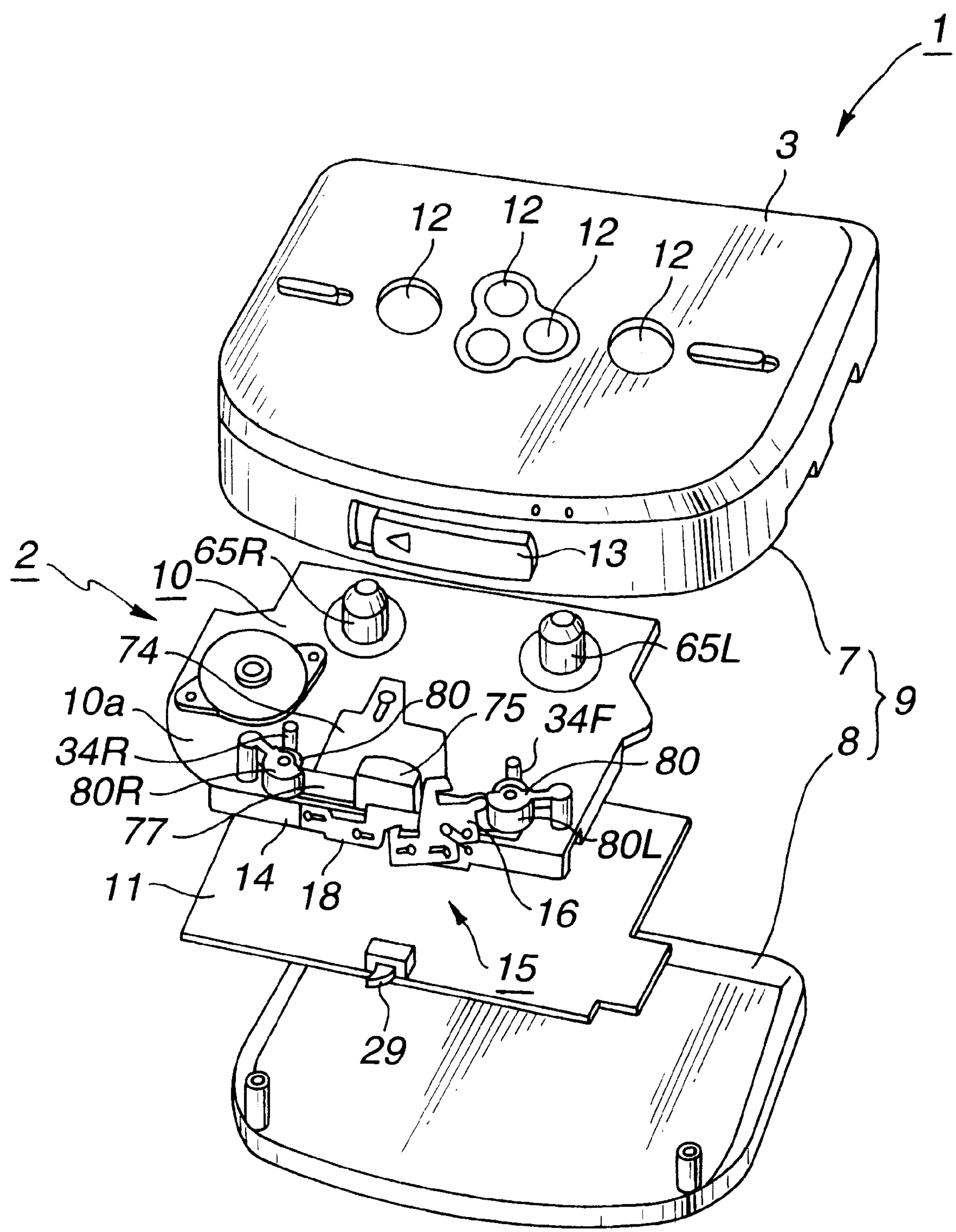
FIG. 5 is an exploded perspective view of the tape player according to the present invention.

A tape player 1 according to the present invention includes a body section 2 and a cover member 3 which opens/closes the body section 2, as shown in FIG. 3. The body section 2 is provided with an attachment section 6 to which a tape cassette 6 containing a magnetic tape 4 is contained. As shown in FIG. 5, the body section 2 includes a cabinet 9 consisting of a frame-like upper cabinet half 7 and a lower cabinet half 8 assembled in the lower side of the half 7. In the cabinet 9, a chassis 10 and a print board 11 are respectively provided in the upper and lower sides, and various members forming the mechanical part of tape player 1 are mounted on the chassis 10.

Figure 4:
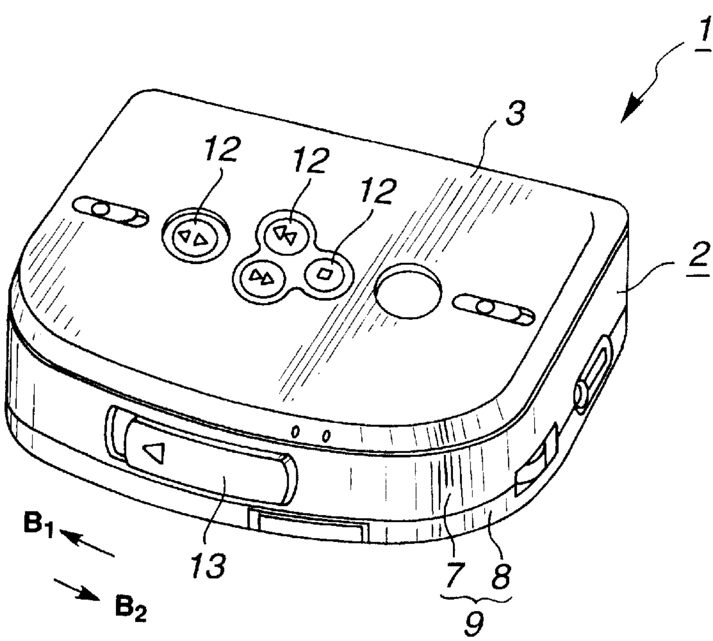
FIG. 4 is a perspective view of the tape player where the cover member is opened.

The cover member 3 which opens/closes the attachment section 6 provided in the body section 2 has an end portion rotatably supported on the upper cabinet half 7, and an engage portion 3*a* having an inverted L-shape is formed at a front end portion of the cover member 3 so as to project downwards as shown in FIG. 4. When this cover member 3 is rotated in a direction (hereinafter called a closing direction) in which the upper surface of the body section 2 is closed, the engage portion 3*a* is engaged with a lock member of a lock mechanism described later and thus locked at a closed position. When the engagement between the engage portion 3*a* and the lock member is released, the cover member 3 is rotated in a direction (hereinafter called an opening direction) in which the upper surface is opened. On the upper surface of the cover member 3, as shown in FIGS. 3 and 4, there are provided a plurality of mode selection keys 12 for switching the mode selection switch to select an operation mode of the tape player 1, and a volume operation key for adjusting the sound volume. In the tape player 1 according to the present invention, a magnetic tape 4 contained in a tape cassette 5 is let travel at a constant speed in the forward or reverse direction by operating the mode selection keys 12, to select various operation modes of reproduction of information signals, forced feed of the magnetic tape 4, rewind, and the like.

On the front surface of the upper cabinet half7 forming part of the body section 2, as shown in FIGS. 3 and 4, a release knob 13 for releasing the lock of the cover member 13 is supported to be slidable in the lateral direction. When the release knob 13 is operated to slide toward the left side in FIG. 3, the engagement between the engage portion 3*a* and the lock member is released, so the cover member 3 is rendered rotatable in the direction in which the attachment section provided on the upper surface side of the body section 2 is opened. On the front surface side of the upper cabinet half 7, there is provided a notch portion 7*a* where a part of the lock mechanism is to be provided.

On the chassis 10 provided in the body section 2, a mount portion 14 is formed by bending one side of the front end portion of the chassis, as shown in FIG. 5. At this mount portion 14, a lock mechanism 15 for locking the cover member 3 at the closed position is provided. Also at the mount portion 14, as shown in FIG. 6, a spring hang hole 14*b* where an end of a toggle spring 17 forming part of the lock mechanism 15 hangs is formed, and an insertion hole 14*a* is formed, positioned at the substantial center portion.

Figure 6:
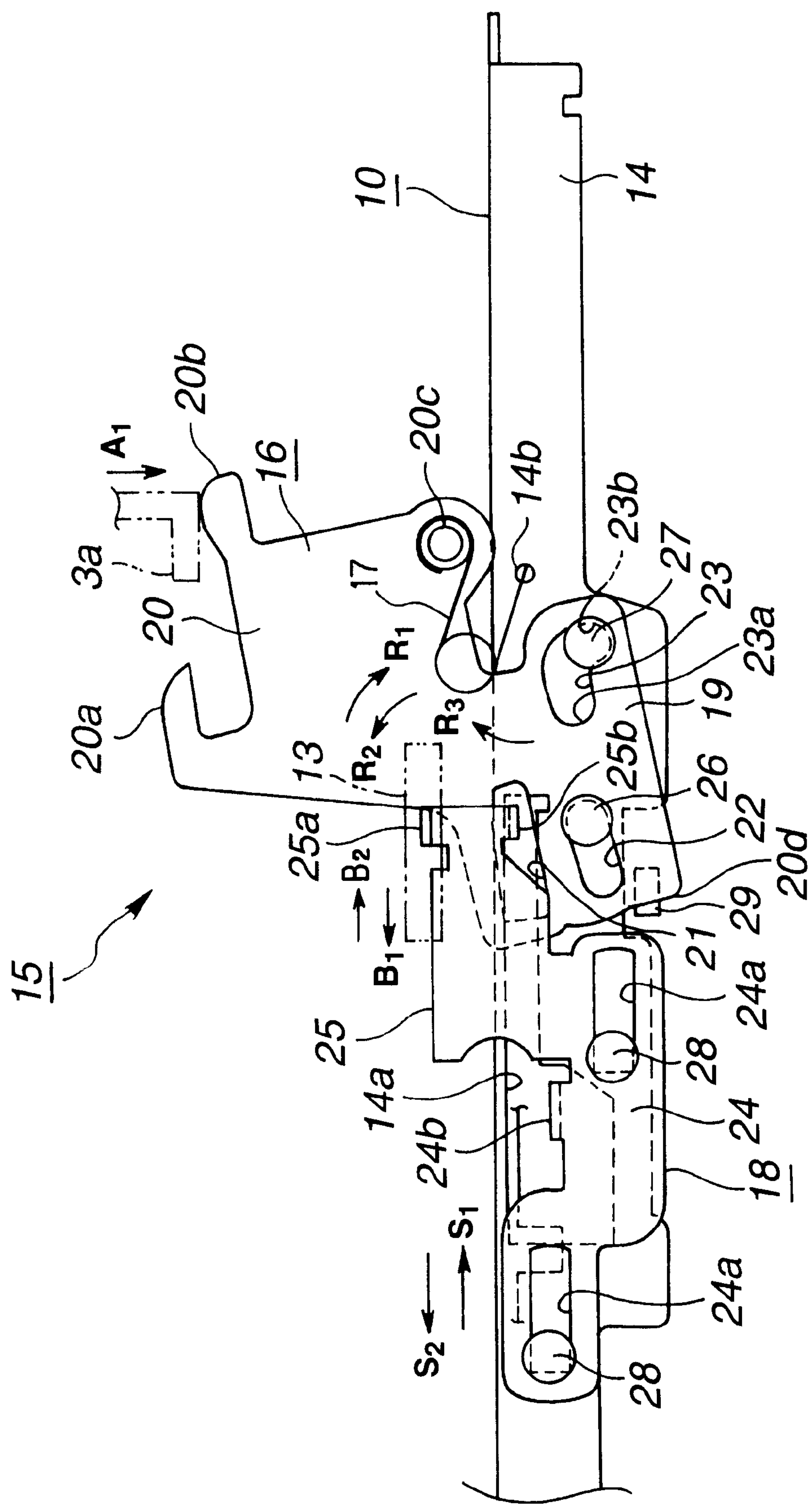
FIG. 6 is a front view showing a lock mechanism of a cover member before the cover member is locked.
Figure 7:
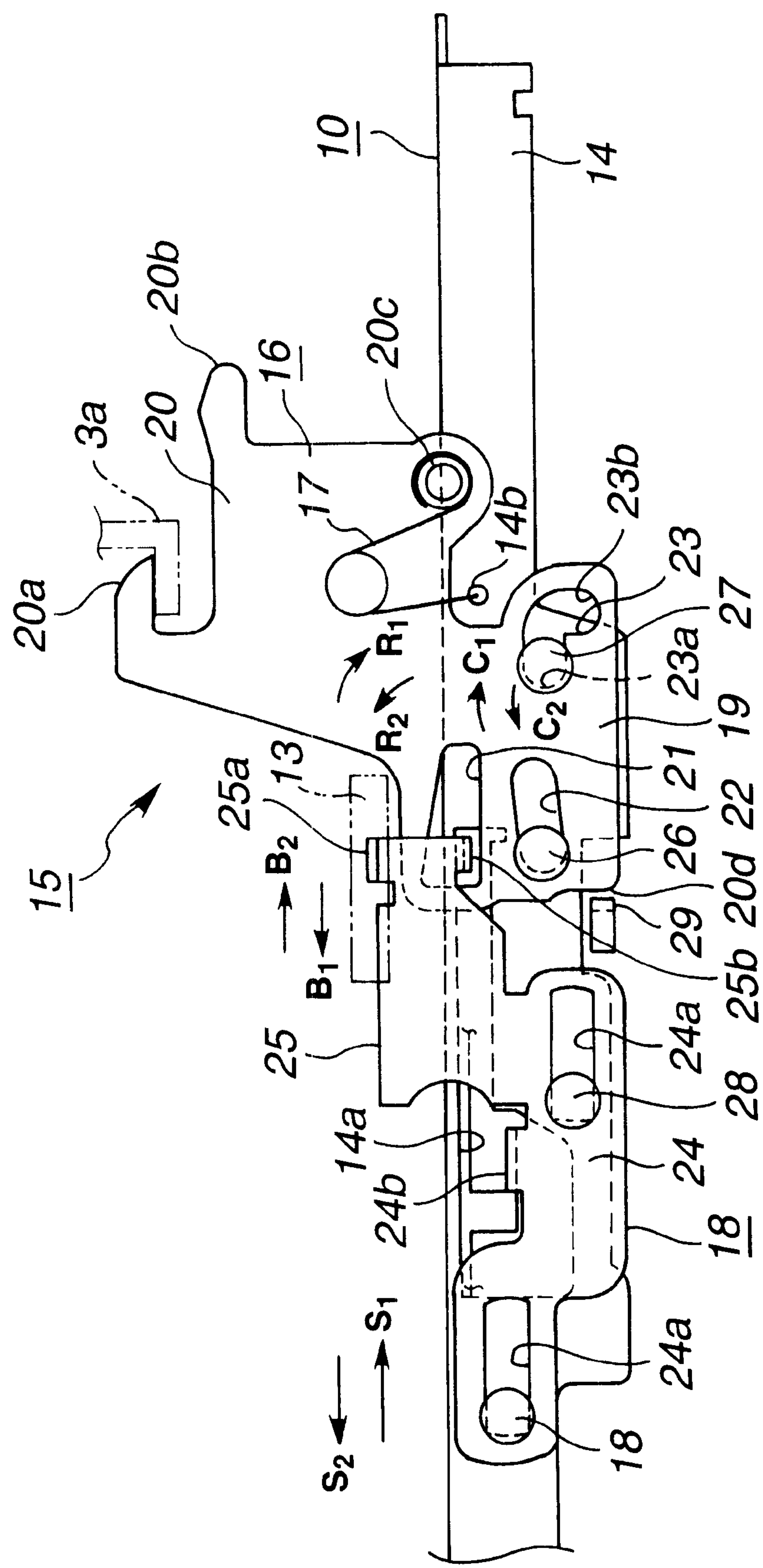
FIG. 7 is a front view showing the lock mechanism of the cover member where the cover member is locked.
Figure 8:
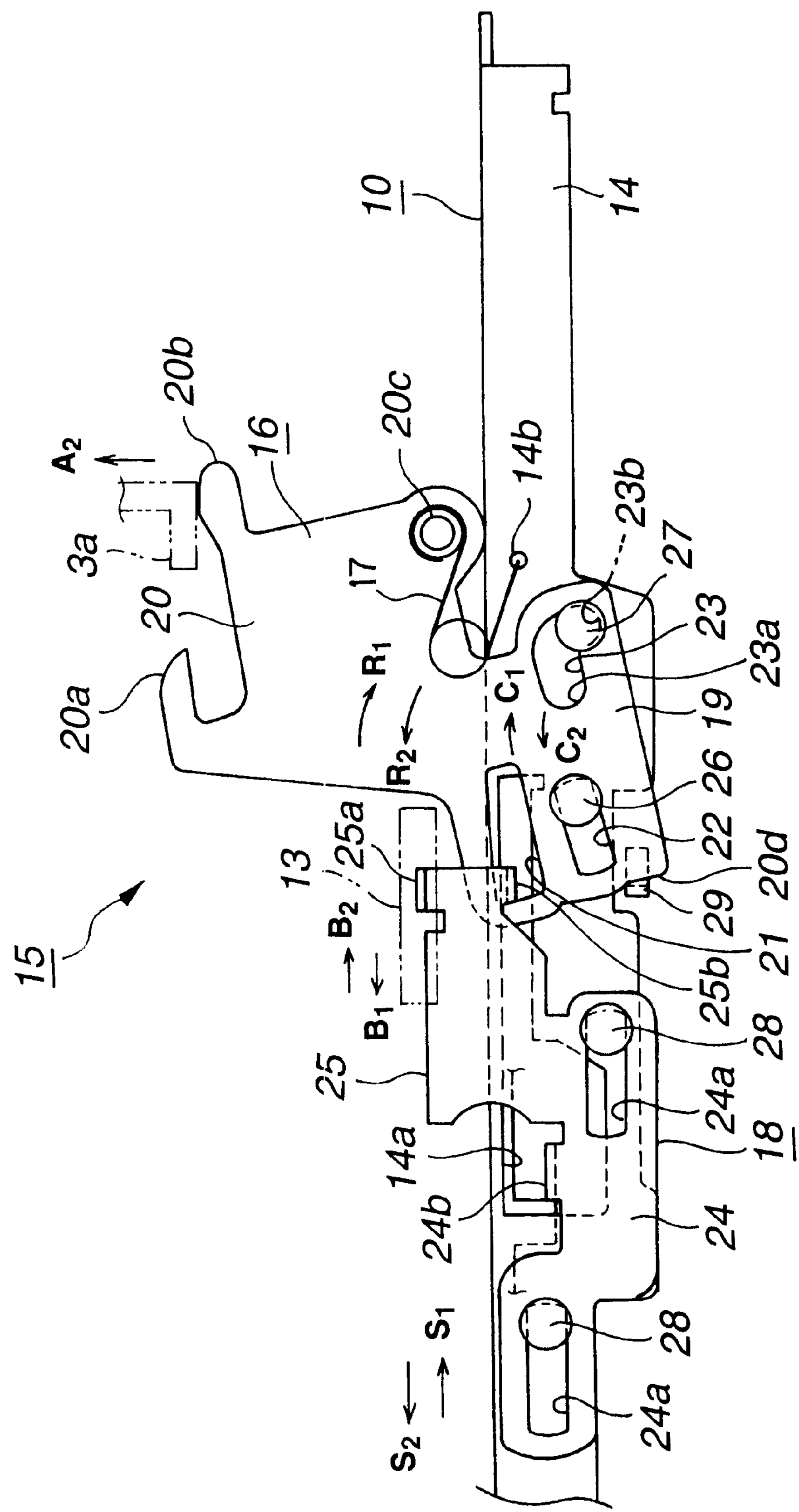
FIG. 8 is an enlarged front view of the lock mechanism of the cover member immediately after lock of the cover member is released.

The lock mechanism 15 supported on the mount portion 14 is comprised of a lock member 16, a toggle spring 17, and a connection piece 18 for connecting the release knob 13 and the lock member 16 with each other, as shown in FIGS. 6 to 8.

Figure 16:
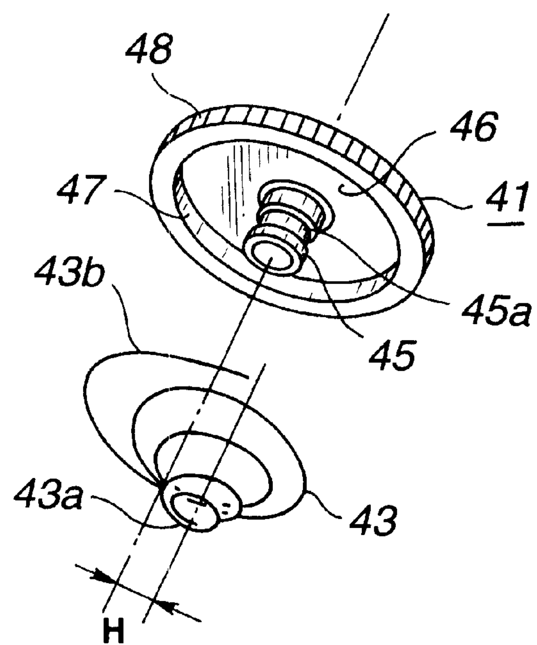
FIG. 16 is a perspective view showing a positional relationship between a coil spring and a shaft portion of the clutch gear and FIGS. 17A–17F are plan views showing a positional relationship between the cam gear and a slide projection in each operation mode.

As shown in FIG. 16, the lock member 16 is arranged such that a support piece 19 and a lock piece 20 projected upward from the support piece 19 in the figure are formed integrally. Formed at the left side part of the support piece 19 in the figure are a connection hole 21 and a first support hole 22 which extend in the lateral direction in the figure and are positioned apart from each other in the vertical direction. A second support hole 23 is formed at the right side part of the lock member 16 in FIG. 6. The second support hole 23 in the right side comprises a first portion 23*a* elongated in the lateral direction of the support piece in FIG. 6 and a second portion 23*b* extending substantially downward by a short length from the right end portion of the first portion 23*a* in FIG. 6. Thus, the second support hole is substantially L-shaped. At the upper end portion of the left end portion of the lock piece 20, as shown in FIG. 6, an engage portion 20*a* which is substantially L-shaped is projected sideward, and a rotary operation piece 20*b* is formed so as to project further from the engage portion 20*a*. At the lower end portion of the right end portion of the lock piece 20 in FIG. 6, a ring-like spring hang portion 20*c* is formed. Further, the lower edge of the left end portion of the support piece 19 is used as an operation portion 20*d* for operating a detection switch which will be described later.

The connection piece 18 is formed so as to extend in the lengthwise direction of the mount portion 14, as shown in FIG. 6, and includes a support portion 24 and a connection portion 25 which projects short upward from the upper end of the right end portion of the support portion 24 in FIG. 6 and further extends long rightward. A pair of support holes 24*a* each having a longer diameter in the lengthwise direction of the mount portion 14, with a distance maintained between each other laterally in FIG. 6, are formed in the support portion 24 of the connection piece 18. At the substantial center portion thereof, there is formed a press piece 24*b* projecting backward. At the upper end portion of the right end portion of the connection portion 25 in FIG. 6, a first connection projection 25*a* projected forward is formed, and a second connection projection 25*b* projected backward is formed at the lower end portion of the right end portion.

As shown in FIG. 6, the lock member 16 is movable on the mount portion 14 within a range between the first and second support holes 22 and 23, in a manner in which support pins 26 and 27 standing on the mount portion 14 provided for the chassis 10 are respectively inserted in the first and second support holes 22 and 23. Also, the connection piece 18 is movable laterally on the mount portion 14 within a range between the support holes 24*a* in a manner in which the support pins 28 standing on the mount portion 14 are respectively inserted in the support holes 24*a*. This lock member 16 receives an energizing force from the toggle spring 17 attached between the spring hang portion 20*c* and the spring hang hole 14*b* formed in the mount portion 14, to be thereby rotated and shifted in the direction of the arrow R1 or R2 in FIG. 6, about the support pins 26 and 27 engaged in the first and second support holes 22 and 23.

The connection piece 18 kept supported on the mount portion 14 is moved and energized in the direction of the arrow $S_1$ in FIG. 6 by a spring member not shown. In the connection piece 18, which receives the energizing force from the spring ember and is thus kept moved in the direction of the arrow $S_1$ in FIG. 6, the press piece 24*b* penetrates through an insertion hole 14*a* of the mount portion 14 and is projected into the lower surface side of the chassis 10. A first connection projection 25*a* projected forward is connected with the release knob 13 which is slidably supported on the front surface of the upper cabinet half 7. A second connection projection 25*b* provided for the connection piece 18 is positioned in the connection hole 21 of the lock member 16, as shown in FIG. 6.

A pressed piece of the lock base described later, which is supported on the lower surface of the chassis 10 is positioned adjacent to the press piece 24*b* of the connection piece 18 inserted in the insertion hole 14*a*. When the connection piece 18 is moved in the direction of the arrow $S_2$ in FIG. 7 from the position shown in FIG. 6, the pressed piece is pressed by the press piece 24*b,* so the lock base is moved in the direction of the arrow S2 in FIG. 6, which is the same direction as the moving direction of the connection piece 18.

A detection switch 29 is provided at the front end portion of the print board 11 provided in the apparatus body 2. This detection switch 29 is to detect the opened and closed states of the cover member 3. If the detection switch 29 is in an ON state, supply of a current from a power source not shown to a motor described later is enabled. If the detection switch 29 is in an OFF state, the supply of the current to the motor is stopped. This detection switch 29 is provided at the position at which the switch can be pressed and operated by the operation portions **20*d* of the lock member 16 which is rotated so as to swing in the direction of the arrow $R_1$ and $R_2$ in FIGS. 6 to 8, about the support pins 26 and 27**.

Where the cover member 3 is rotated to the position at which the attachment section 6 for the tape cassette 5 provided in the apparatus body 2 is opened, the support pins 26 and 27 are respectively positioned at the right end of the first support hole 22 and the lower end of the second portion **23*b* of the support hole 23. In this situation, as shown in FIG. 6, the lock member 16 is shifted to the upper side of the chassis 10 and is thus kept rotated in the direction of the arrow $R_2$ in FIG. 6. At this time, as shown in FIG. 6, the lock member 16 is maintained at a non-lock position in which the spring hang piece 20*c* of the lock piece 20 is rotated and energized in the direction of the arrow $R_2$ in FIG. 6 and the engagement with the engage portion 3*a* provided for the cover member 3** is released.

When the lock member 16 is thus in the non-lock position, as shown in FIG. 6, the connection piece 18 receives the energizing force from the spring member and is kept shifted in the direction of the arrow $S_1$ in FIG. 6, and the support pins 28 make contact with the left ends of the support holes **24*a* in FIG. 6, so the movable ranges of the positions of the pins are restricted. At this time, the second connection projection 25 of the connection piece 18 is in contact with a right end portion in the connection hole 21 of the lock member, as shown in FIG. 6. The detection switch 29 provided on the print board 1 is operated and set into the OFF state by the operation portion 20*d* of the lock member 16**, so the supply from the power source to the motor is stopped.

As the cover member 3 is rotated from the state shown in FIG. 4 where the attachment portion 6 is opened, in the direction in which the attachment portion 6 is closed, the engage portion **3*a* provided on the cover member 3 presses the rotary operation piece 20*b* of the lock member 16 in the direction of the arrow $A_1$ in FIG. 6 in which the piece 20*b* comes close to the chassis 1. When the engage portion 3*a* presses the rotary operation piece 20*b* in the direction of the arrow $A_1$ in FIG. 6, the lock member 16 is rotated in the direction of the arrow $R_1$ with the support pin 26 set as the fulcrum of the rotation. At this time, the toggle spring 17 is rotated in the clockwise direction of the arrow $R_3$ in FIG. 6, about a portion thereof which is engaged with the spring hang hole 14*b* of the mount portion 14, as the fulcrum of the rotation. When the lock member 16 is rotated by a predetermined angle in the direction of the arrow $R_1$ in FIG. 6, the toggle spring 17 exceeds the dead point and the lock member 16 is further rotated in the direction of the arrow $R_1$ in FIG. 6 by the spring force thereof. In addition, the first and second support holes 22 and 23 are guided and moved in the direction of the arrow $C_1$ by the support pins 26 and 27, and as shown in FIG. 7, the engage portion 3*a* of the cover member 3 is retained at the lock position of the cover member 3, at which the portion 3*a* is engaged with the engage portion 20*a*. That is, the lock member 16 is arranged such that the support pin 26 provided in the mount portion 14 side of the chassis 10 is positioned in the left end side of the first support hole 22, and the support pin 27 is positioned in the left end side of the first portion 23*a* of the second support hole 23. Further, the engage portion 20*a* is engaged with the engage portion 3*a* of the cover member 3 by rotation of the lock member 16 in the clockwise direction of the arrow $R_1$ in FIG. 7 and movement thereof in the direction of the arrow $C_1$ in FIG. 7. The cover member 3 is locked at the position in which the attachment portion formed on the upper surface of the body section 2 is closed, as shown in FIG. 3. At this time, the lock member 16 is moved rightward in the direction of the arrow $C_1$ in FIG. 7 by the spring force of the toggle spring 17, thereby releasing the state of the detection switch 29 pressed and operated by the operation 20*d*, so the detection switch 29** is switched to the ON state in which supply of the power to the motor is enabled.

When the lock member 16 is in a state in which the cover member 3 is locked at the closed position, the connection piece 18 is kept moved in the direction of the arrow $S_1$ in FIG. 7, and the second connection projection **25*b* is positioned at the left end portion of the connection hole 21 in FIG. 7. That is, when the release knob 13 on the front surface of the upper cabinet half 7 is operated and slid leftward in the direction of the arrow $B_1$ in FIGS. 3 and 7, in the state shown in FIG. 7 in which the cover member 3 is locked by the lock member 16, the connection piece 18 connected with the release knob 13 is moved leftward in the direction of the arrow $S_2$ in FIG. 7. By the movement of the connection piece 18 in the direction of the arrow $S_2$ in FIG. 7, the second connection projection 25*b* of the lock member 16 presses the concave bottom portion of the connection hole 21 of the lock member, so the lock member 16 is moved to a predetermined position in the left side in the direction of the arrow $C_2$ in FIG. 7. As the lock member 16 is moved in the direction of the arrow $C_2$ in FIG. 7, the toggle spring 17 exceeds the dead point, and the lock member 16 is rotated in the anti-clockwise direction of the arrow $R_2$ in FIG. 7, about the support pin 26 as the fulcrum of the rotation. As the lock member 16 is rotated in the direction of the arrow $R_2$ in FIG. 7, the engagement between the engage portion 3*a* of the cover member 3 and the engage portion 20*a* provided on at the lock member 16 is released, so the cover member 3 is brought into a condition in which the cover member 3 is rotatable in the direction in which the attachment portion 6** is released.

That is, the support pin 26 is positioned in the right end side of the first support hole 22 of the lock member 16, as shown in FIG. 8, and the support pin 27 is positioned in the lower end side of the second portion **23*a* of the second support hole 23. By the leftward movement of the lock member 16 in the direction of the arrow $C_2$ in FIG. 7 and the anti-clockwise rotation thereof in the direction of the arrow $R_2$ in FIG. 7, the engagement between the engage portion 20*a* and the engage portion 3*a* of the cover member 3 is released so the lock of the cover member 3** at the closed position is released.

At this time, the rotary operation piece **20*b* of the lock member 16 pushes up the engage portion 3*a* of the cover member 3 in the direction of the arrow $A_2$ in FIG. 8 in which the engage portion 3*a* is moved apart from the chassis 10, so the cover member 3 is slightly rotated in the direction in which the attachment section 6 is opened. Further, in accordance with the rotation of the lock member 16 based on the spring force of the toggle 17, the detection switch 29 is pressed again by the operation portion 20*d*, so the detection switch 29** is switched into the OFF state thereby to stop supply of the power to the motor.

Figure 1:
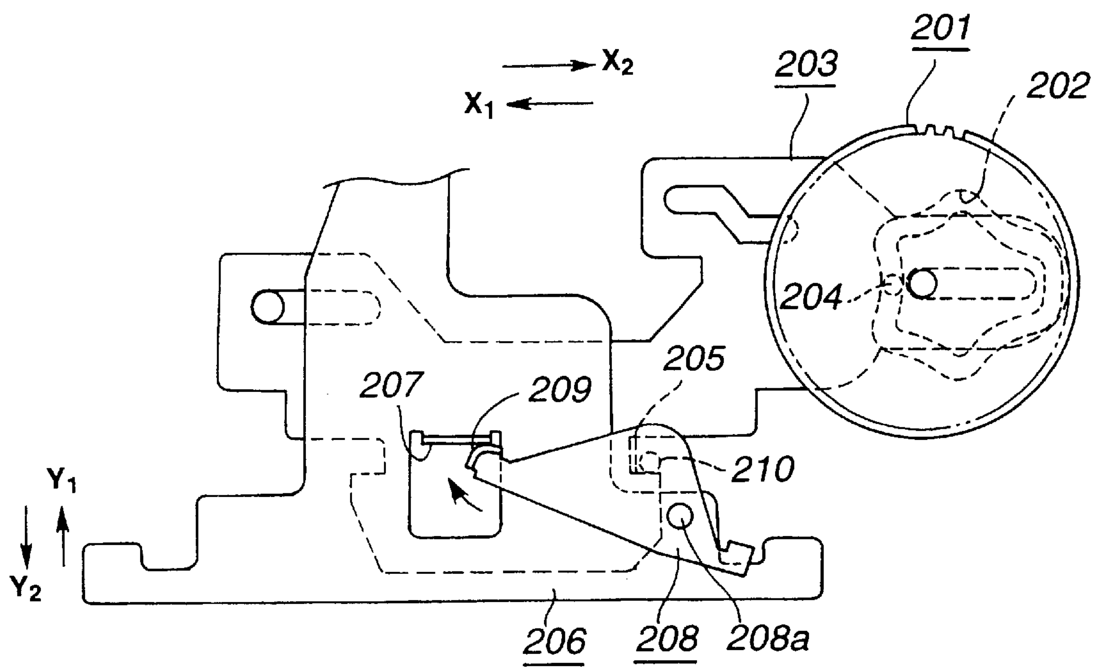
FIG. 1 is a plan view showing a part of a magnetic tape drive mechanism used in a conventional tape recorder, before the mode switch lever is shifted.
Figure 2:
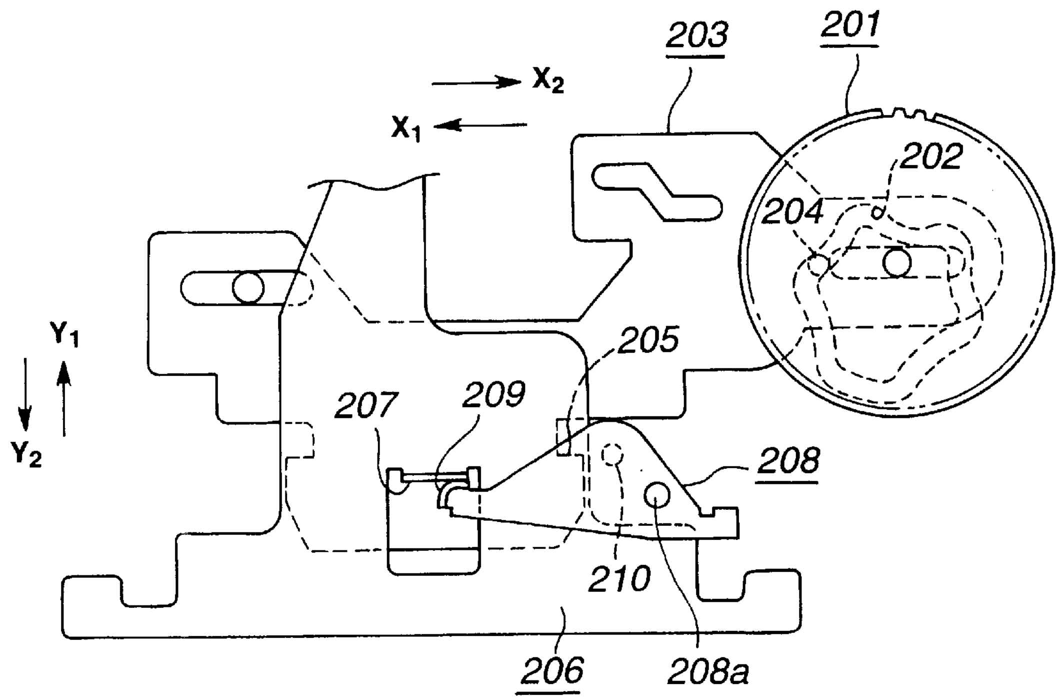
FIG. 2 is a plan view showing a state after the mode lever is shifted.

If the movement operation of the release knob 13 in the direction of the arrow $B_1$ in FIG. 1 is released, the energizing force of the spring member which moves and energizes the connection piece 18 is transmitted through the connection piece 18, and the initial position is recovered through a movement in the direction of the arrow $B_2$ in FIGS. 3 and 8. The lock mechanism 15 accordingly recovers its initial position in which the cover member 3 is opened as shown in FIG. 6.

As described above, the detection switch 29 is pressed or released by the movement of the lock member 16, so the lock member 16 is selectively maintained at a lock position where the lock member 16 locks the cover member 3 at the closed position by the spring force of the toggle spring 17 and at a non-lock position where the lock of the cover member 3 is released. Therefore, in a state where the lock member 16 has reached the lock position of the cover member 3 and the cover member 3 has been locked, the operation of pressing the detection switch 29 is released, so this detection switch 29 is always switched into the ON state and the power supply to the motor is enabled securely. Accordingly, it is possible to prevent the power from being supplied to the motor in a state where the cover member 3 is not completely closed, or to prevent the power supply to the motor from being stopped in a state where the cover member is not opened. Thus, it is not necessary to improve the precision of the ON/OFF range of the detection switch 29, so the precision of the ON/OFF range of the detection switch 29 can be relaxed.

As for detection of the opened and closed states of the cover member, it is possible to consider a mechanism in which an operation projection is provided for the cover member and a hole facing the detection switch provided on the print board provided in the chassis side is formed, so that the ON/OFF operation of the detection switch is achieved by operating the detection switch by the operation projection when the cover member is rotated. However, as described above, by arranging such that the detection switch 29 is operated by the operation of the lock member 16 forming part of the lock mechanism 15, the hole facing the operation element of the detection switch 29 need not be formed in the chassis 10, and besides, the operation projection need not be provided for the cover member 3, so processing of the cover member and the chassis is facilitated and assembly thereof are also facilitated. Further, since the hole facing the detection switch need not be formed in the chassis 10, the strength of the chassis 10 is not lowered.

Further, by operating the detection switch 29 depending on the movement of the lock member 16 and by maintaining the lock member 16 at the lock position and the non-lock position by the toggle spring 17, detection and the like of the opened and closed states of the cover member 3 depending on the detection switch 29 can be realized by a simple mechanism.

In the lock mechanism of the cover member 3 described above, since the lock member 16 and the connection piece 18 are attached to the mount section 14 directly formed integrally on the chassis 10, the number of components can be reduced and the number of assembly steps can also be reduced.

Next, explanation will be made of a tape drive mechanism provided for the tape player 1 according to the present invention. The tape drive mechanism is incorporated in the chassis 10 provided in the body section 2. The tape drive mechanism 30 shown in FIG. 9 is set in the FWD (forward) reproducing mode in which a magnetic tape 4 contained in a tape cassette 5 travels in the forward rotation direction as a first direction in which the magnetic tape 4 travels at a constant speed from a tape reel to another tape reel which are rotatably supported in a cassette half, and information signals recorded on a magnetic tape 4 are reproduced.

The tape drive mechanism 30 includes a drive motor 31 which is capable of rotating forward and in reverse and is supported on the chassis 10, as shown in FIG. 7. A pulley 31 a is attached to the rotary shaft of the drive motor 31. Further, a pair of first and second fly wheels 32L and 32R are supported on the chassis 10 with a lateral distance interposed therebetween, and an endless belt 33 is tensioned over the pulley 31*a* and the first and second fly wheels 32L and 32R. The first and second fly wheels 32L and 32R are rotated by drive of the drive motor 31, and are rotated integrally with a FWD capstan 34F and a REV capstan 34R, respectively, which are each projected in the surface side of the chassis 10. Note that the first fly wheel 32L and the second fly wheel 32R are always rotated in directions opposite to each other, depending on how the belt 33 is tensioned, regardless of the rotation direction of the drive motor 31.

Figure 9:
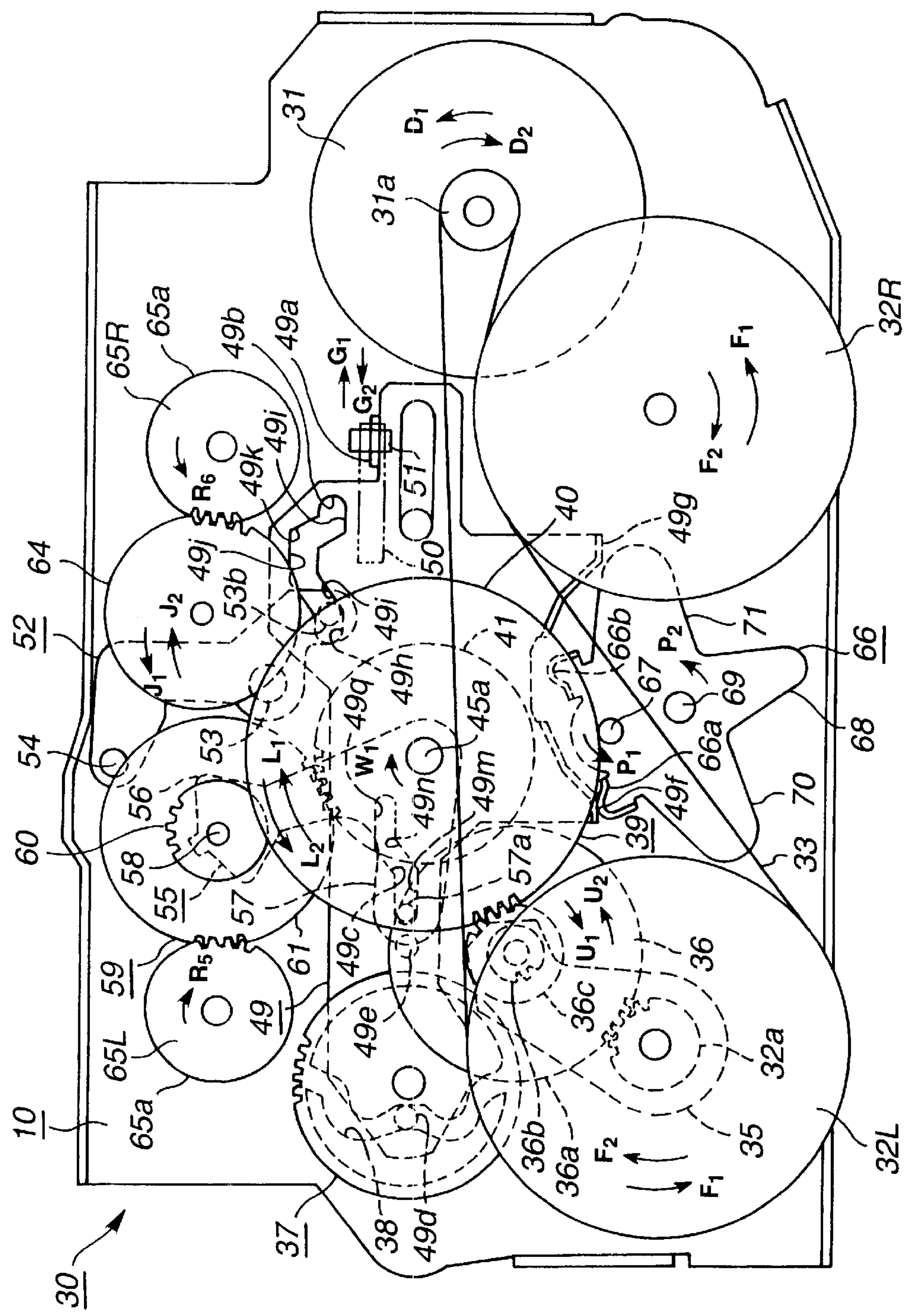
FIG. 9 is a plan view showing a tape drive mechanism where the FWD reproducing mode is selected.

On the first fly wheel 32L positioned in the left side in FIG. 9, a small diameter gear portion 32*a* is integrally formed to be coaxial with the rotary shaft of the fly wheel 32L. Further, the rotary base 35 is supported on the chassis 10, so as to be rotatable about the rotation center of the first fly wheel 32L as the rotation center. A transmission gear 36 is supported on the top end portion of the rotary base 35. As for the transmission gear 36, three gear portions are integrally formed such that a small gear portion 26*b* is situated in the chassis side with a large gear portion 36*a* inserted therebetween, a medium gear 36*c* is situated in the side opposite to the chassis 10, and the large gear portion 36*a* is engaged with the small gear portion 32*a* of the first fly wheel 32L.

Figure 13:
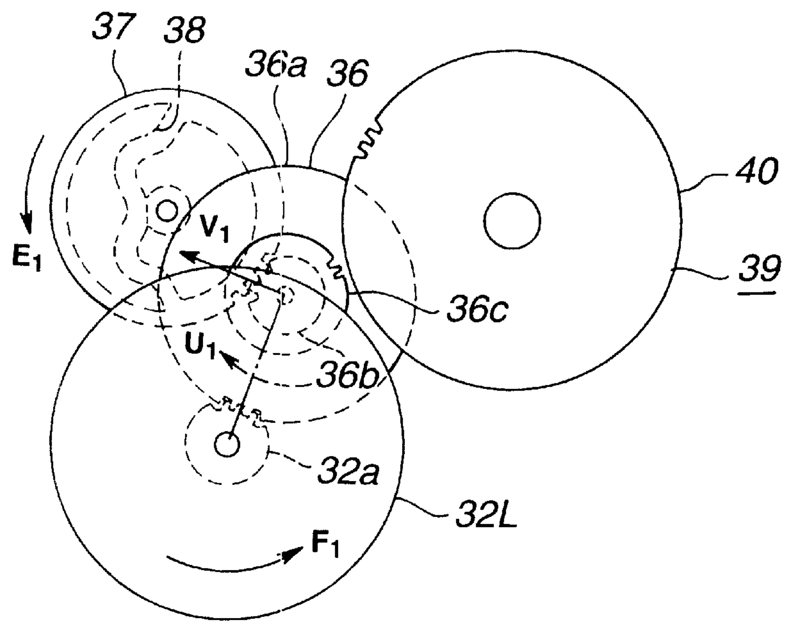
FIG. 13 is a plan view showing a state where a transmission gear and a cam gear are engaged with each other.

The drive motor 31 provided on the chassis 10 is capable of rotating forward and in reverse. Therefore, when the drive motor 31 is rotated in the anti-clockwise direction of the arrow $D_1$ in FIG. 9, the first fly wheel 32L is also rotated in the anticlockwise direction of the arrow $F_1$ in FIG. 9, so the transmission gear 36 engaged with the small diameter gear portion 32*a* is rotated in the direction $V_1$ as shown in FIG. 13 in accordance with the rotation of the small gear portion 32*a* in the direction of the arrow $F_1$. The small gear portion 36*b* of the transmission gear 36 is then engaged with the cam gear described later, which is supported on the chassis 10.

Figure 14:
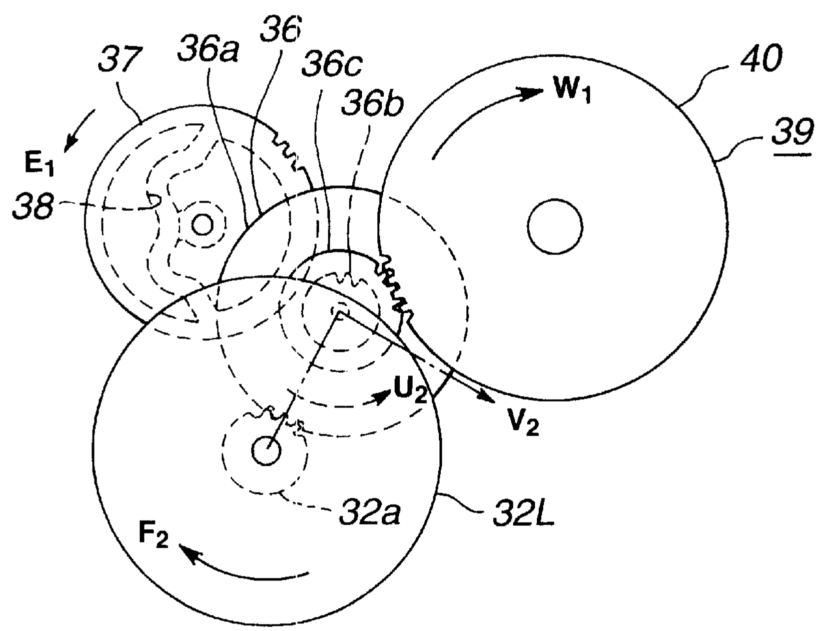
FIG. 14 is also a plan view showing a state where a transmission gear and a cam gear are engaged with each other.

Alternatively, when the drive motor 31 is rotated in the clockwise direction of the arrow $D_2$ in FIG. 9, the first fly wheel 32L is also rotated in the clockwise direction of the arrow $F_2$ in FIG. 9, so the transmission gear 36 engaged with the small diameter gear portion 32*a* is rotated in the direction $V_2$ as shown in FIG. 14, in accordance with the rotation of the small gear portion 32*a* in the direction of the arrow $F_2$ in FIG. 13. The medium gear portion 36*c* of the transmission gear 36 is engaged with the clutch gear described later, which is supported on the chassis 10. In the state where the transmission gear 36 is engaged with the cam gear 37, respective operation modes of the tape player 1 are rendered selectable. In the state where the transmission gear 36 is engaged with the clutch gear 39, the magnetic tape 4 is allowed to travel.

The cam gear 37 is a member which receives a drive force from the transmission gear 36 and is thereby rotated, to form the respective modes, i.e., the FWD reproducing mode in which information signals recorded on the magnetic tape 5 are reproduced, the FF mode in which the magnetic tape 5 travels at a constant speed from a tape reel to another tape reel, the REV reproducing mode in which information signals recorded on the magnetic tape 5 are subjected to reverse reproduction, and the REW mode in which the magnetic tape 5 is rewound. As shown in FIG. 9, a cam groove 38 formed in a predetermined shape is formed in the surface of the side of the cam gear 37 opposed to the chassis 10. As shown in FIG. 9, this cam groove 38 is formed such that those portions of the groove that are opposite to each other with respect to the center portion of the groove as have shapes symmetrical to each other, and such that the open ends of the end portions positioned at the outer circumferential side of the cam gear 37 are set at positions distant from each other substantially by 180° with respect to the rotation axis of the cam gear 37 as the center of the rotation, i.e., in the positions in the opposite sides.

Figure 15:
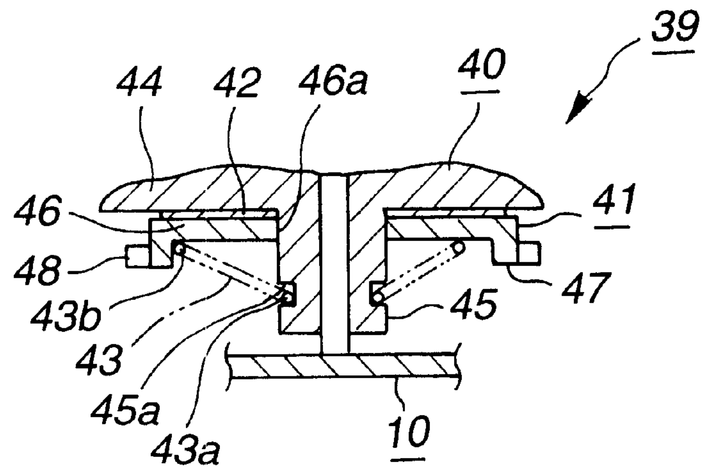
FIG. 15 is a cross-sectional view showing a clutch gear constructing a tape player according to the present invention.

The clutch gear 39 is formed by coupling together a large gear 40 formed as a first rotary member and a small gear 41 formed as a second rotary member, as shown in FIG. 15, and the clutch mechanism is formed by the large gear 40, the small gear 41, a friction sheet 42, and a coil spring 43. In this clutch mechanism, when a predetermined load or more is applied to rotation of the small gear 41 with a predetermined friction force generated between the large gear 40 and the small gear 41 which are arranged coaxial to each other, the small gear 41 rotates slipping on the large gear 40. When the load to the rotation of the small gear 41 is smaller than the predetermined load, the small gear 41 rotates integrally with the large gear 42. When the magnetic tape 4 which is pinched between a FWD capstan 34F or a REV capstan 34R and a pinch roller described later is fed at a constant speed and wound on a reel base, the magnetic tape 4 is properly wound in accordance with the wind diameter which changes gradually every moment, without causing the slack.

Figure 10:
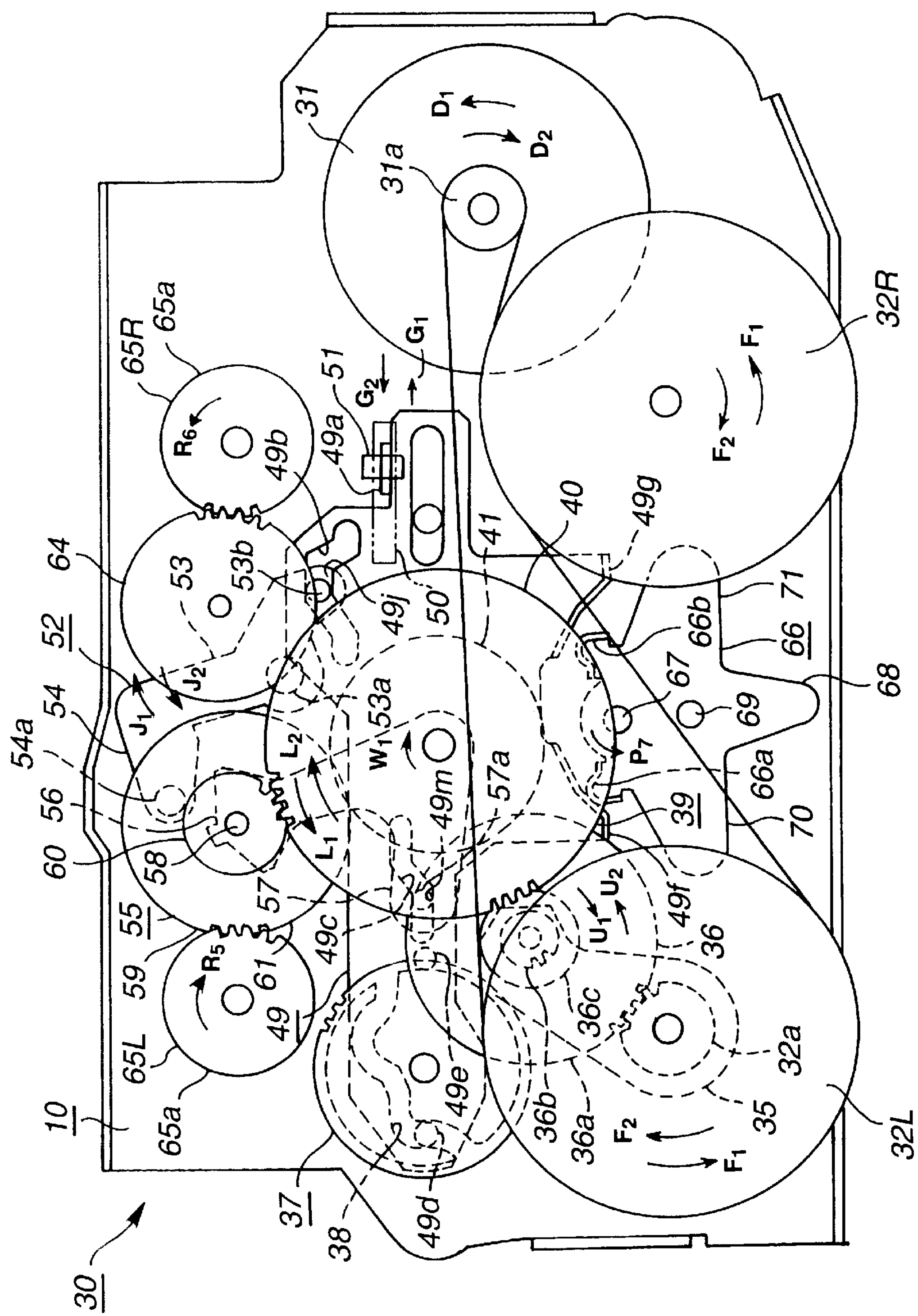
FIG. 10 is a plan view showing the tape drive mechanism where the FF mode is selected.

The large gear 40 forming part of the clutch gear 39 is supported on the chassis 10 as shown in FIG. 10, and has a disk-like gear portion 44 and a shaft portion 45 projected from the center portion of the gear portion 44 to the chassis 10 side. An engage groove 45*a* is formed at the top end portion of the shaft portion 45. The small gear 41 has a ring-like contact portion 46 with an insertion hole 46*a* formed at the center portion thereof, and a ring-like limiter portion 47 projected from the outer circumferential portion of the contact portion 46 in the direction opposite to the large gear 40. A gear portion 48 is formed so as to project outward from the top end edge of the limiter portion 47.

The coil spring 43 provided for the clutch gear 39 is wound in the form of a substantially truncated conical shape, so the upper and lower end portions are formed as an end portion 43*a* in the small diameter side and an end portion 43*b* in the large diameter side. This coil spring 43 is formed coaxially, except the end portion in the large diameter side, as shown in FIGS. 15 and 16, and the top end half in the top end side of the end portion 43*b* in the large diameter side is projected in the direction perpendicular to the axial direction. The center of the end portion 43*b* in the large diameter side is formed to be shifted in the perpendicular direction from the center of the end portion 43*a* in the small diameter side by an amount equivalent to the arrow H in FIG. 16.

This clutch mechanism is assembled such that with the shaft portion 45 of the large gear 40 inserted orderly through the ring-like friction sheet 42 and the insertion hole 46*a* of the small gear 41, a part of the end portion 43*a* of the coil spring 43 in the small diameter side is engaged with the engage groove 45*a* of the shaft portion 45, and the end portion 43*b* in the large diameter side is pressed into contact with the contact portion 46 of the small gear 41. In the clutch mechanism thus assembled, the small gear 41 is pressed and energized to the large gear 40 by the coil spring 43, and the small gear 41 is rotatable slipping on the large gear 40 with the friction sheet 42 inserted therebetween. When the small gear 41 is rotated slipping, the end portion 43*a* of the coil spring 43 in the small diameter side slides on the shaft portion 45 in the engage groove 45*a.* Thus, the top end side half of the end portion 43*b* of the coil spring 43 in the large diameter side is projected in the perpendicular direction, and the center of the end portion 43*b* in the large diameter side is positioned to be shifted in the perpendicular direction from the center of the end portion 43*a* in the small diameter side by the amount equivalent to the arrow H in FIG. 16. Therefore, in the state in which the coil spring 43 is attached to the shaft portion 45, a part of end portion 43*b* of the coil spring 43 in the large diameter side is pressed into contact with the inner surface of the limiter portion 47 of the small gear 41. Due to the presscontact of the end portion 43*b* in the large diameter side to the limiter portion 47, the coil spring 43 is energized in the direction in which the center of the end portion 43*a* in the small diameter side is positioned, i.e., in the direction of the arrow F in FIG. 15, so the portion of the small-diameter-side end portion 43*a* positioned in the side of the perpendicular direction received the energizing force from the coil spring 43 and is thereby pressed into contact with the coil spring 43.

Since the large-diameter-side end portion 43*b* of the coil spring 43 is thus pressed into contact with the limiter portion 47 and the small-diameter-side end portion 43*a* is pressed into contact with the shaft portion 45, this state is always maintained when the small gear 41 rotates slipping on the large gear 40. It is therefore possible to prevent the coil spring 43 from being shifted with respect to the shaft portion 45 during rotation, and to prevent changes of the assembled state such as a change of the engagement portion of the small-diameter-side end portion 43*a* relative to the shaft portion. Accordingly, the spring load of the coil spring 43 to the small gear 41 is always maintained constantly, so the rotation torque of the small gear 41 can be stabilized.

Further, at the substantial center portion of the chassis 10, there is provided a mode switch lever 49, as shown in FIG. 9. This mode switch lever 49 is supported to be movable in the directions of the arrows $G_1$ and $G_2$ in FIG. 9. The mode switch lever 49 is stopped at four positions corresponding to the FWD reproducing mode, FF mode, REW mode, and REV reproducing mode. The stop positions of the mode switch lever 49 are detected by the mode detection switch 50. The mode detection switch 50 is attached to the print board 11 provided to be opposed to the bottom surface side of the chassis 10, and four detection portions which respectively detect the four stop positions of the mode switch lever 49 are provided in parallel with the moving direction of the mode switch lever 49. The mode detection switch 50 is switched when an operation element 51 attached to the operation element mount section 49*a* provided for the mode switch lever 49 is moved in accordance with the movement of the mode switch lever 49. Thus, the stop position of the mode switch lever 49 is detected, so the respective operation modes are detected.

The mode switch lever 49 is formed as an elongated lever as shown in FIG. 9. A first cam hole 49*b* is formed at an end side of the lever, and a second cam hole 49*c* different from the first cam hole 49*b* is formed at the substantial center portion in the lengthwise direction. At another end side of the mode switch lever 49, first and second slide projections 49*d* and 49*e* are provided and disposed in parallel with a predetermined distance maintained therebetween. These first and second slide projections 49*d* and 49*e* are engaged such that only one of these projections is movable following the cam groove 38 with the projections positioned in the sides opposite to each other with the rotation center of the cam gear 37 interposed therebetween. Also, in one side of the mode switch lever 49, first and second standing pieces **49*f* and 49*g*** are formed to be disposed in parallel with a predetermined distance maintained therebetween.

Note that the first cam hole **49*b* formed in one end side of the mode switch lever 49 is constructed by sequentially and continuously forming a first horizontal portion 49*h*, a first slanting portion 49*i*, a second horizontal portion 49*j*, a second slanting portion 49*k*, and a third horizontal portion 49*i*, from the other end side of the mode switch lever 49** toward the former end side.

The second cam hole **49*c* formed in the other end side of the mode switch lever 49 is constructed by sequentially and continuously forming a first horizontal portion 49*m*, a first slanting portion 49*n*, and a second horizontal portion 49*o*.**

Further, the first and second standing pieces **49*f* and 49*g* formed in one side of the mode switch lever 49 are formed such that horizontal and slanting portions continue in the moving direction of the mode switch lever 49**.

The positional relationship among the cam gear 37 and the first and second slide projections **49*d* and 49*e* in respective operation modes will be explained with reference to FIGS. 17 and 18. FIGS. 17 are views showing the positional relationship among the cam gear 37 and the first and second slide projections 49*d* and 49*e* of the mode switch lever 49 engaged with the cam groove 38 of the cam gear 37, in respective operation modes of the tape player 1**.

Figures 17A, 17B, 17C, 17D, 17E, 17F:
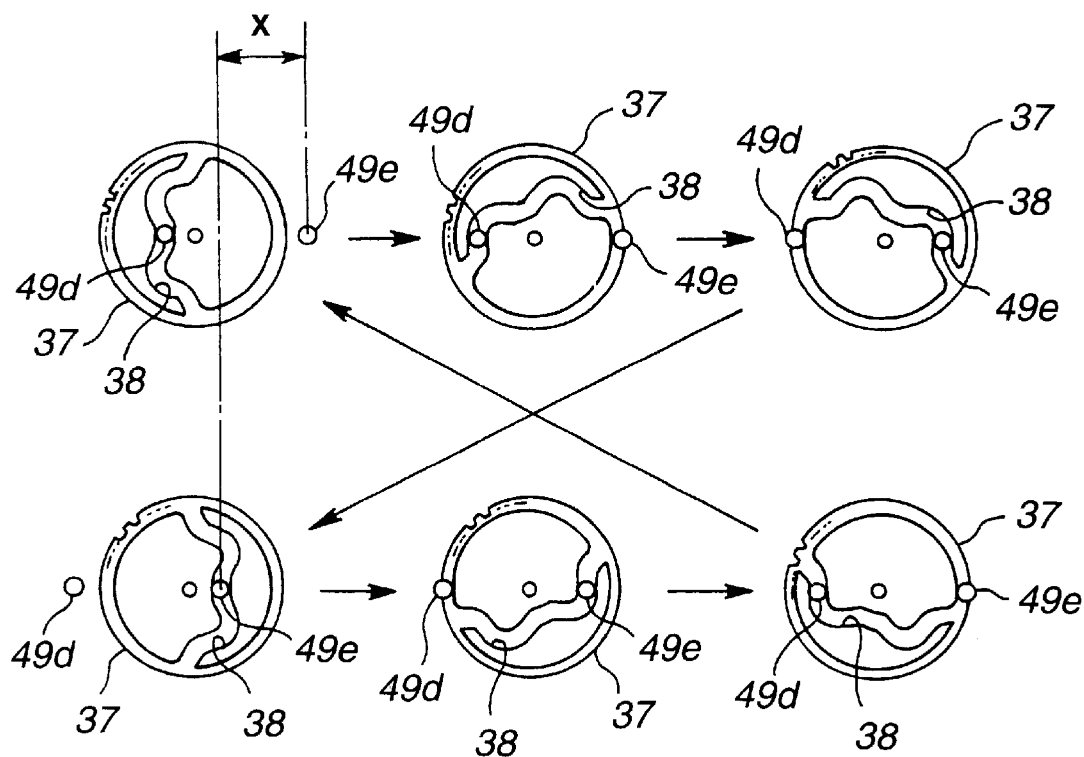

In FIG. 17A, FIG. 17F, FIG. 17A shows a state in the FWD reproducing mode, and FIGS. 17B and 17F show states in the FF mode. FIGS. 17C and 17E show states in the REW mode, and FIG. 17D shows a state in the REV reproducing mode. Note that the FF mode and the REW mode each include two states. For example, setting is arranged as follows. In case where the FF or REW mode is formed from the FWD reproducing mode shown in FIG. 17A, a close state in the directions of the arrow in FIGS. 17A–17F is set, i.e., the state of the FF mode in FIG. 17B or the REW mode in FIG. 17C is set. Otherwise, in case where the FF or REW mode is formed from the REV reproducing mode in FIG. 17D, a close state in the directions of the arrows shown in FIGS. 17A–17F is set, i.e., the FF mode in FIG. 17F or the REW mode in FIG. 17E is set.

Formation of respective modes of the tape play 1 according to the present invention is determined depending on the distance from the rotation center of the cam gear 37 to the first slide projection **49*d* or the second slide projection 49*e* engaged in the cam groove 38 of the cam gear 37, as shown in FIGS. 17A to 17F. The state shown in FIG. 9, in which the mode switch lever 49 is most moved in the direction of the arrow $G_1$ in FIG. 9 among respective operation modes, indicates the FWD reproducing mode. The state shown in FIG. 12, in which the mode switch lever 49 is most moved in the direction of the arrow $G_2$ in FIG. 9, indicates the REV reproducing mode. The distance of the movement of the mode switch lever 49 is indicated by the range marked with the arrow X in FIGS. 17**.

Figure 18:
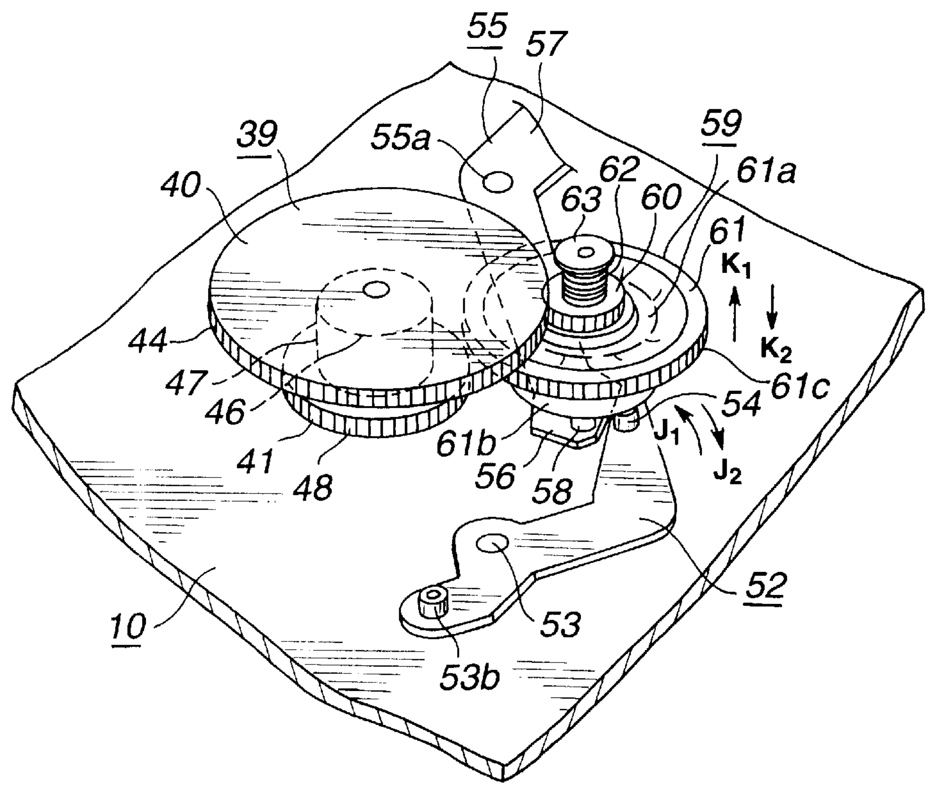
FIG. 18 is a perspective view showing a state of engagement between a transform gear and the clutch gear, where a small diameter portion of the transform gear is engaged with the clutch gear.
Figure 19:
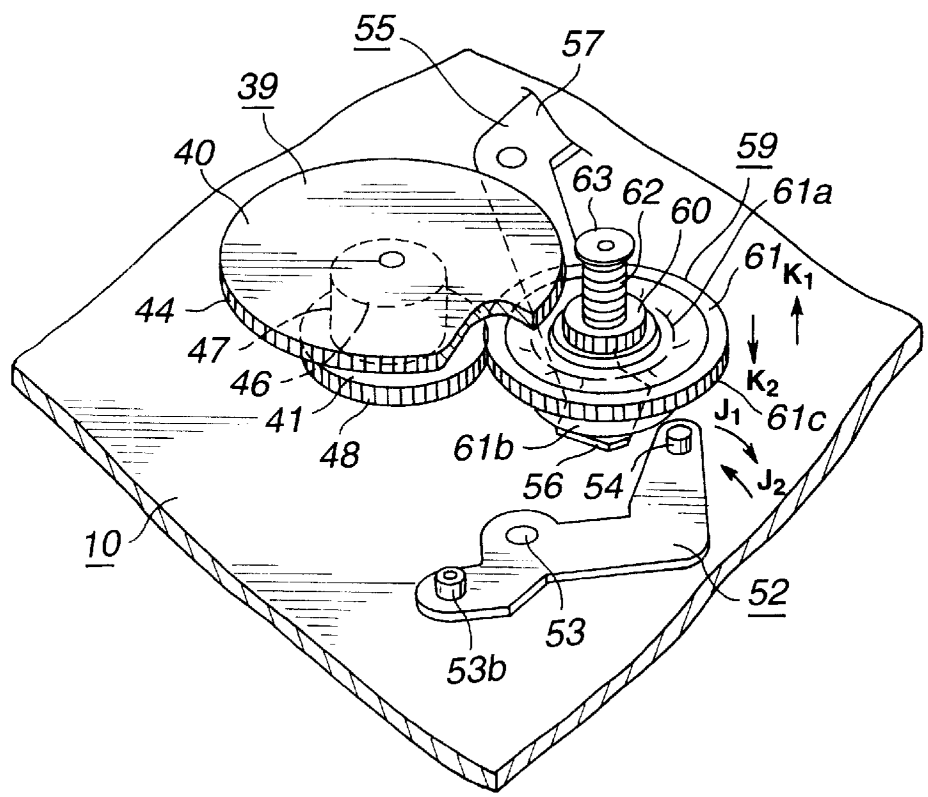
FIG. 19 is a perspective view showing a state in which a large diameter portion of the transform gear is engaged with the clutch gear.

Also, a push-up lever 52, which is rotated and operated by the movement of the mode switch lever 49 thereby to change the engaging state of the conversion gear 59 engaged with the clutch gear 39, is rotatably supported on the chassis 10, as shown in FIGS. 9, 18, and 19. This push-up lever 52 is formed in a substantial L-shape, as shown in FIG. 9, and is attached such that an intermediate portion in one end side of this lever is pivoted on a support shaft 53 standing on the chassis 10. The push-up lever 52 is rotated in the direction of the arrow $J_1$ or $J_2$ in FIGS. 18 and 19, about the support shaft 53. As for the push-up lever 52, an engage projection **53*d* is formed at the top end in the side of one end portion thereof which is supported on the support shaft 53. This engage projection 53*b* is slidably engaged in the first cam hole 49*b* of the mode switch lever 49, as shown in FIG. 9. Also, a push-up projection portion 54 projecting in the side opposite to the chassis 10 is formed at the other end side of the push-up lever 52**.

Further, a conversion lever 55 is rotatably supported on the chassis 10, as shown in FIGS. 9, 18, and 19. As shown in FIG. 9, this conversion lever 55 is comprised of a gear support portion 56 for supporting the conversion gear 59 and a support portion 57 extended from an end side of the gear support portion 56, which are formed integrally and are substantially L-shaped as a whole. The conversion lever 55 is mounted to be rotatable about a support shaft **55*a* in a manner in which the connecting portion, which connects the gear support portion 56 with the support portion 57 and which corresponds to a bent position thereof bent in the L-shape, is supported on the support shaft 55*a* set to stand on the chassis 10. Through a support shaft 58 set to stand on the top end portion of the gear support portion 56 provided on the conversion lever 55, the conversion gear 59 is supported to be movable in the direction of the arrow $K_1$ and the direction of the arrow $K_2$ in FIGS. 18 and 19, which are equal to the axial direction of the support shaft 58. In addition, an engage projection 57*a* is set to stand on the top end portion of the support portion 57. This engage projection 57*a* is slidably engaged with the second cam hole 49*c* provided for the mode switch lever 49**.

The conversion gear 59 supported movably on the support shaft 58 provided on the conversion lever 55 is integrally formed with a small diameter gear portion 60 and a large diameter gear portion 61 respectively positioned upside and downside in the axial direction of the support shaft 58. The large diameter gear portion 61 is formed such that the center portion thereof is curved to be concave as shown in FIGS. 18 and 19. That is, the large diameter gear portion 61 is comprised of a bottom surface portion **61*a*, a slanting portion 61*b* slanting gradually so as to stand from the bottom surface portion 61*a* toward the outer circumferential side, and a gear portion 61*c* formed on the outer circumferential surface. The small diameter gear portion 60 is formed to be coaxial with the large diameter gear. 61, such that this portion 60 is layered on the large diameter gear portion 61**.

In the state in which the conversion gear 59 supported on the support shaft 58, the support shaft 58 is projected from the small diameter gear portion 60 to the side opposite to the chassis, and a compression coil spring 62 is attached at the portion thus projected. This compression coil spring 62 is provided, kept compressed, between a stopper ring 63 attached to the top end portion of the support shaft 58 and the small diameter gear portion 60, and moves and energizes the conversion gear 59 to the chassis 10 side in the direction of the arrow $K_2$ in FIGS. 18 and 19. The conversion gear 59 is moved in accordance with rotation of the conversion lever 55. When the conversion lever 55 is rotated in the clockwise direction in the direction of the arrow $L_1$ in FIG. 9, the large diameter gear portion 61 is engaged with a slave gear described later. Also, when the conversion lever 55 is rotated in the anti-clockwise direction in the direction of the arrow $L_2$ in FIG. 9, the large diameter gear portion 61 is engaged with the gear portion of the reel base described later, which is supported in the left side of the chassis in FIG. 9.

Also, the push-up lever 52 is rotated by moving the mode switch lever 49. When the push-up lever 52 is rotated in the anti-clockwise direction of the arrow $J_2$ in FIG. 9, the push-up projection portion 54*a* of the push-up lever 52 slides on and makes contact with the slanting portion 61*b* of the conversion gear 59 and is brought into contact with the bottom surface of the bottom surface portion 61*a*. The conversion gear 59 is moved in the direction of the arrow $K_1$ in FIG. 18 in which the gear 59 is moved apart from the chassis 10, against the energizing force of the compression coil spring 62, and the small diameter gear portion 60 is engaged with the large gear 40 of the clutch gear 39, as shown in FIG. 18. In this state, the gear portion 61*c* of the large diameter gear portion 61 is not engaged with any gear. Inversely, when the push-up lever 52 is rotated in the clockwise direction of the arrow $J_2$ in FIG. 9 from the state shown in FIG. 18 by the movement of the mode switch lever 49, the push-up projection portion 54*a* of the push-up lever 52 is moved apart from the conversion gear 59, and the conversion gear 59 receives the energizing force from the compression coil spring 62 and is moved in the direction of the arrow $K_2$ in FIG. 19 in which the conversion gear 59 is moved close to the chassis 10. The engagement between the small diameter gear portion 60 and the large gear 40 of the clutch gear 39 is released, so the gear portion 61*c* of the large diameter gear portion 61 is engaged with the small gear 41 of the clutch gear 39.

A slave gear 64 is supported on the chassis 10 in one side of the conversion gear 59 supported on the push-up lever 52, such that the slave gear 64 is adjacent to the conversion gear 59, as shown in FIG. 9. This slave gear 64 is engaged with a gear portion 65*a* formed on the outer circumferential surface of the second reel base 65R supported on the chassis 10, as shown in FIG. 9. In addition, the first reel base 65L supported on the chassis 10 is positioned in the other side of the conversion gear 59, as shown in FIG. 9. The first and second reel bases 65L and 65R are arranged such that the portions thereof other than the gear portions 65*a* project in the side of the mount section 6 for the tape cassette 5. The first reel base 65L serves to feed the magnetic tape travel forward to achieve FWD reproducing or FF, and the second reel base 65R serves to feed the magnetic tape reversely to achieve REW reproducing or REW.

The first and second reel bases 65L and 65R are applied with slight loads to their rotations by a rotation load applying mechanism not shown, so a backward tension is applied to the traveling magnetic tape 4. When the first reel base 65L or the second reel base 65R is rotated by a drive motor 31 to wind up the magnetic tape 4, a backward tension is applied to the magnetic tape thereby to prevent the magnetic tape from being entangled.

Figure 22:
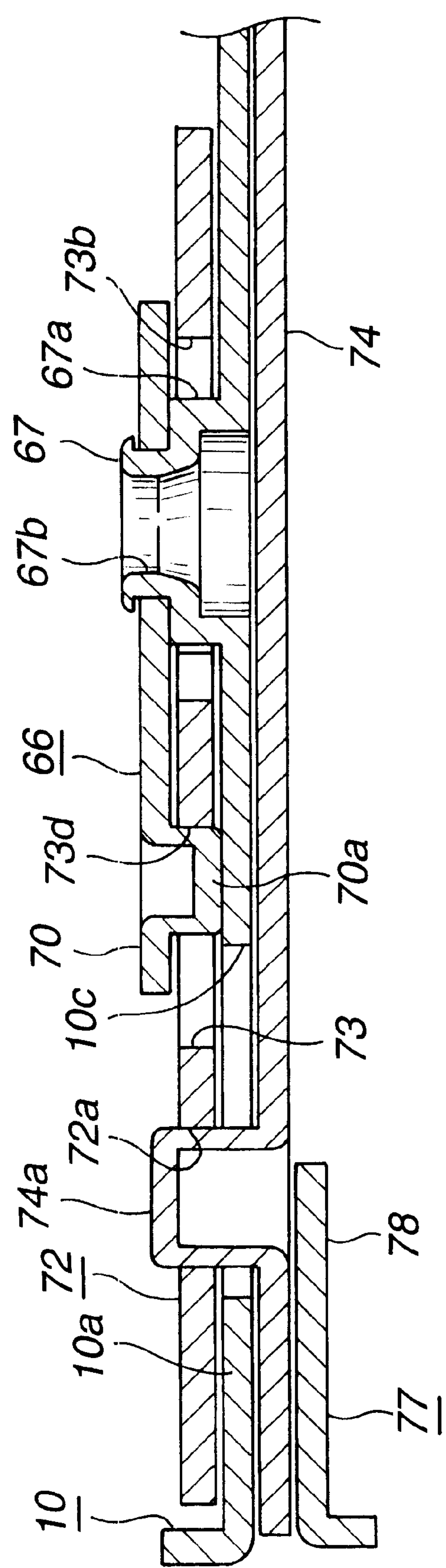
FIG. 22 is a cross-sectional view cut along the line XXII—XXII in FIG. 21.
Figure 23:
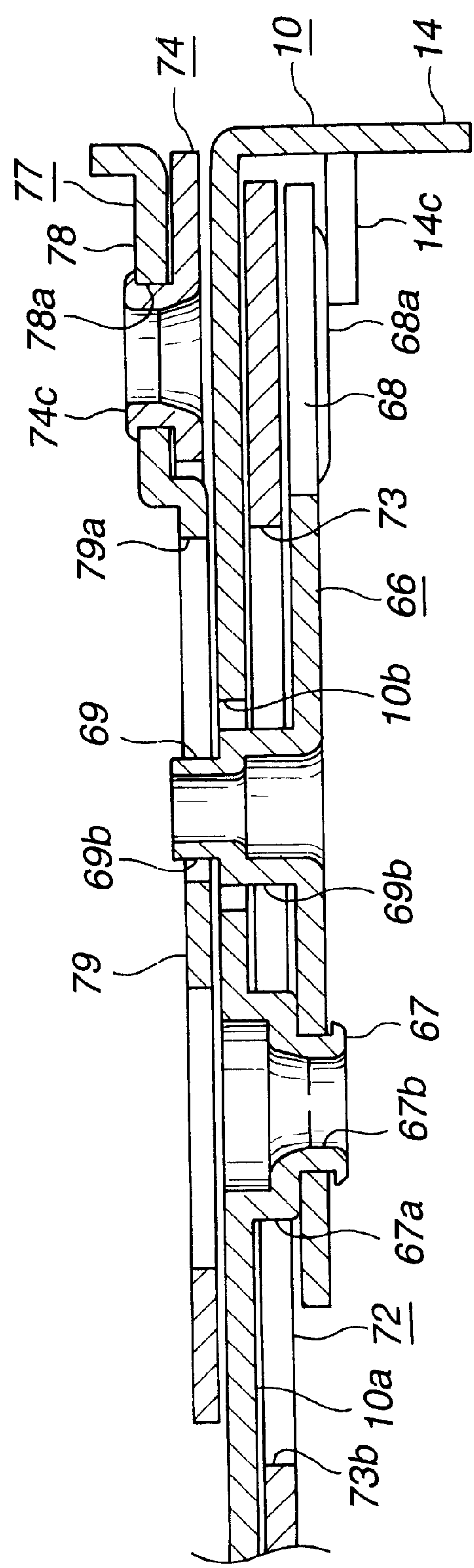
FIG. 23 is a cross-sectional view cut along the line XXIII—XXIII in FIG. 21.

On the chassis 10, as shown in FIG. 9, an operation lever 66 for operating movement of the magnetic head and rotation of the pinch roller is provided between the first and second fly wheels 32L and 32R. As for the operation lever 66, first and second pressure pieces 66*a* and 66*b*, which are pressed and operated by the first or second standing pieces 49*f* or 49*g* provided on the mode switch lever 49, are formed in the side opposed to the mode switch lever 49, and first and second standing pieces 49*f* and 49*g*. This operation lever 66 is supported on the chassis 10 by caulking a support projection portion 67 projected at apart of the chassis 10 and inserted through a through-hole arranged so as to project in the center portion in the side where the first and second pressure pieces 66*a* and 66*b* are provided, as shown in FIGS. 22 and 23. As for the support projection portion 67 formed on the chassis 10, as shown in FIGS. 22 and 23, a first support portion 67*a* having a large diameter is formed at its base portion, and a second support portion 67*b* having a small diameter for supporting rotatably the operation lever 66 is formed in the top side.

Figure 20:
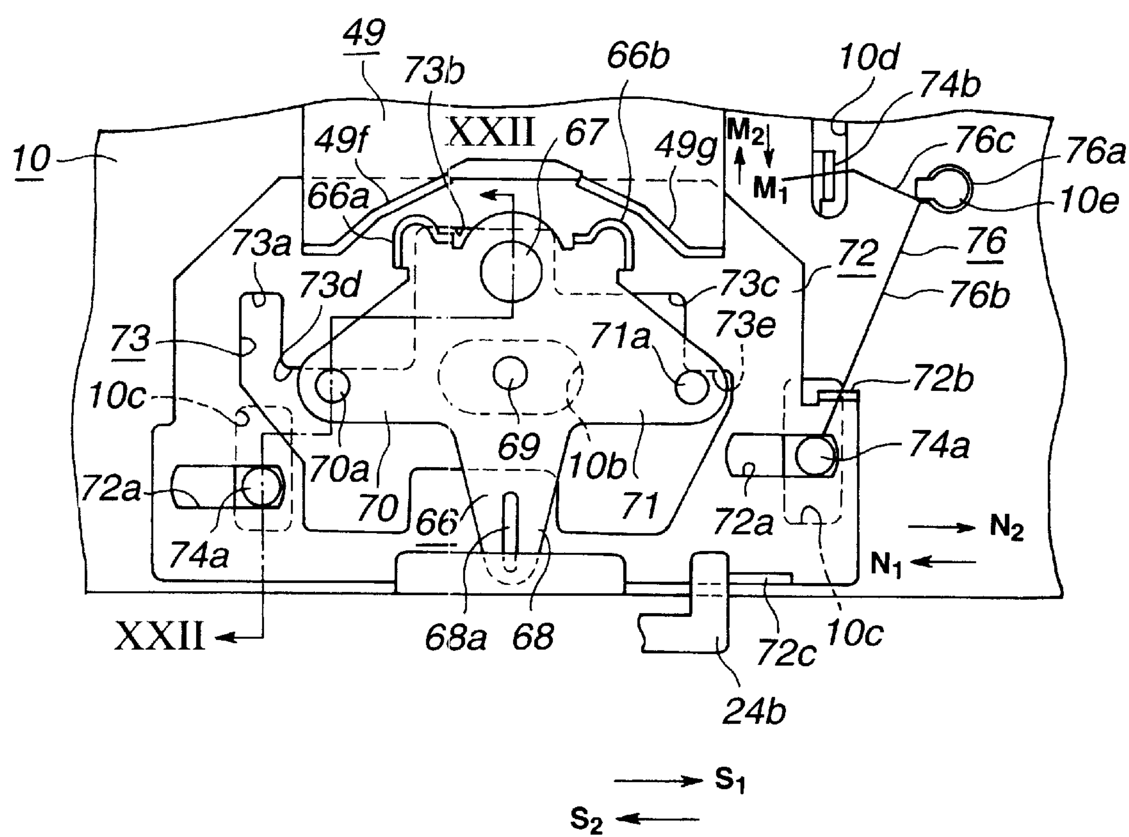
FIG. 20 is a plan view showing an operation lever and a lock base.

As for the operation lever 66, as shown in FIG. 9, a pressure support portion 68 is formed so as to project in the side opposite to the side where the first and second pressure pieces 66*a* and 66*b* are provided. At the center portion of the pressure support portion 68, a projection portion 68*a* is formed so as to project in the side opposite to the chassis 10, as shown in FIGS. 20 and 23. This projection portion 68*a* is brought into slidable contact with a presser portion 14*c* formed by bending a part of the attachment section 14 provided on the chassis 10 within the rotation range of the operation lever 66, thereby to prevent the operation lever 66 from floating from the chassis 10.

Note that the portion pressed by the presser portion 14*c* of the operation lever 66 is an end portion of the projection portion 68*a* and is positioned apart from the rotation fulcrum of the operation lever 66, so a remarkable advantage can be obtained for prevention of floating.

At the center portion of the operation lever 66, as shown in FIG. 9, an engage projection 69 projecting in the side of the chassis 10 is formed. As for this engage projection 69, as shown in FIG. 23, a large diameter portion 69*a* is formed in the side of its base end portion, and a small diameter portion 69*b* is formed in the side of its top end side. Also, a first insertion hole 10*b* to be engaged with an engage projection provided on the operation lever 66 is formed in the chassis 10. The engage projection of the operation lever 66 is arranged such that the large diameter portion 69*a* is positioned in the first insertion hole 10*b* and the small diameter portion 69*b* in the top end side is projected in the lower surface side of the chassis 10, so as to be slidably engaged in the engage hole of the slide base described later. As for the operation lever 66, as shown in FIGS. 9 and 20, first and second pressure pieces 70 and 71 are provided so as to project in both sides of the engage projection 69. First and second pressure projections 70*a* and 71*a* projected toward the chassis 10 are formed respectively on the first and second pressure pieces 70 and 71 by a tightening process. These first and second pressure projections 70*a* and 71*a* each have a top end surface formed to be flat in parallel with the chassis 10, and this top end surface is in contact with the chassis 10. Since the top end surfaces of the first and second pressure projections 70*a* and 71*a* are formed in flat shapes, the operation lever 66 smoothly rotates on the chassis 10, thereby preventing the chassis 10 and the operation lever 66 from being damaged during the rotation.

On the chassis 10, as shown in FIGS. 20, 22, and 23, a lock base 72 is movably supported relatively to the chassis 10 between the operation lever 66 and the chassis 10. If the magnetic head 75 is in contact with the magnetic tape 4 in the FWD reproducing mode and the REV reproducing mode, the contact between the magnetic head 75 and the magnetic tape 4 is forcedly released by this lock base 72 thereby to enable easy extraction of the tape cassette 5 from the attachment section 6, when the cover member 3 is rotated in the direction in which the attachment section 6 provided in the body section 2 is opened.

A pair of engage holes 72*a* each having a long diameter in the direction parallel to the movement direction of the mode switch lever 49 are formed in the lock base 72, as shown in FIG. 20. A spring hang piece 72b is formed near one of the engage holes 72*a* provided in the lock base 72, and a pressed piece 72*c* is formed to stand on the top end portion in one side. This pressed piece 72*c* is pressed by a pressure piece 24*b* provided on the connection piece 18, thereby moving the lock base 72 in the direction of the arrow $S_1$ in FIG. 20, when the connection piece 18 of the lock mechanism 15 is moved in the direction of the arrow $S_1$ in FIGS. 6 and 20.

At the center portion of the lock base 72, an opening portion 73 is formed. A first positioning portion 73*a* is formed at the opening portion 73, so as to be extended in the direction perpendicular to the movement direction of the lock base 72. A clearance portion 73 is formed and positioned at the center portion in the side of the mode switch lever 49. A second positioning portion 73*b* is formed to be continuous to the clearance portion 73*b*. A portion positioned between the first positioning portion 73*a* and the clearance portion 73*b* functions as a first pressed portion 73*d*. Also, the portion adjacent to the second positioning portion 73*c* formed at the opening portion 73 functions as a second pressed portion 73*e*. The first pressed portion 73*d* and the second pressed portion 73*e* are situated at an equal position in the direction perpendicular to the movement direction of the lock base 72.

Further, when the operation lever 66 is at the initial position shown in FIG. 23, the first and second pressure projections 70*a* and 71*a* provided on the first and second pressure pieces 70 and 71 are respectively in contact with the first pressed portion 73*d* and the second pressed portion 73*e*.

The lock base 72, positioned between the operation lever 66 and the chassis 10, is supported movably in the directions of the arrows $N_1$ and $N_2$ in FIG. 20. As shown in FIGS. 22 and 23, the lock base 72 is also supported to be rotatable about a support projection portion 67, by caulking this support projection portion provided on the chassis 10 and inserted through an insertion hole formed to be projected at the center portion in the side where the first and second pressure pieces 66*a* and 66*b*. Further, the first and second pressure projections 70*a* and 71*a* provided at the first and second pressure portions 70 and 71 of the operation lever 66 are formed to have a height which is slightly larger in the thickness direction of the operation lever 66 than the thickness of the lock base 72. Therefore, the first and second pressure projections 70*a* and 71*a* of the operation lever 66 function as limiter sections for limiting the position of the operation lever 66 relative to the chassis 10. Thus, since the size of the first and second pressure projections 70*a* and 71*a* in the thickness direction is set to be slightly larger than the thickness of the lock base 72, the position of the lock base 72 relative to the chassis 10 is limited and the movement of the lock base 72 is smoothened.

Also, since the position of the lock base 72 is limited in relation to the chassis 10 by the first and second pressure projections 70*a* and 71*a* which are formed by the tightening process which allows easy processing and is capable of easily maintaining the size precision, the position of the lock base 72 need not be limited by the caulked portion, i.e., the support projection portion 67 of the chassis 10 supporting the operation lever 66, which is difficult to form with high size precision. Therefore, the size precision of the support projection portion 67 can be relaxed, so the manufacturing steps of the tape player 1 can be simplified and the manufacturing cost can be reduced accordingly. Further, by supporting the lock base 72 arranged between the operation lever 66 and the chassis 10, the operation lever 66 and the lock base 72 can be supported by one support projection portion 67 formed on the chassis 10. It is therefore unnecessary to support the operation lever 66 and the lock base 72 on the chassis 10 by caulking, so the cost can be reduced by thus omitting the caulking step.

Figure 21:
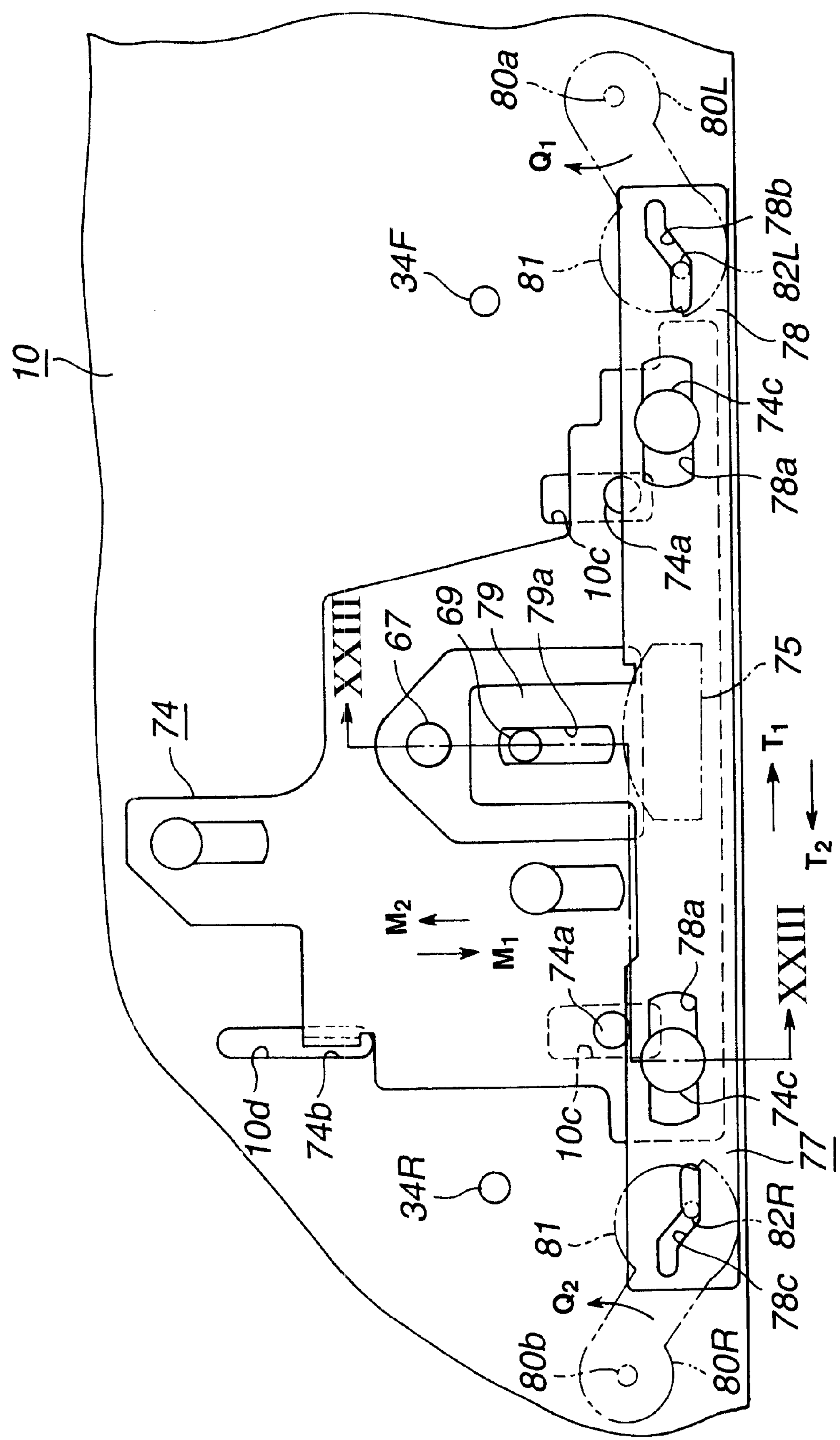
FIG. 21 is a plan view showing a head base and a lock base.
Figure 24:
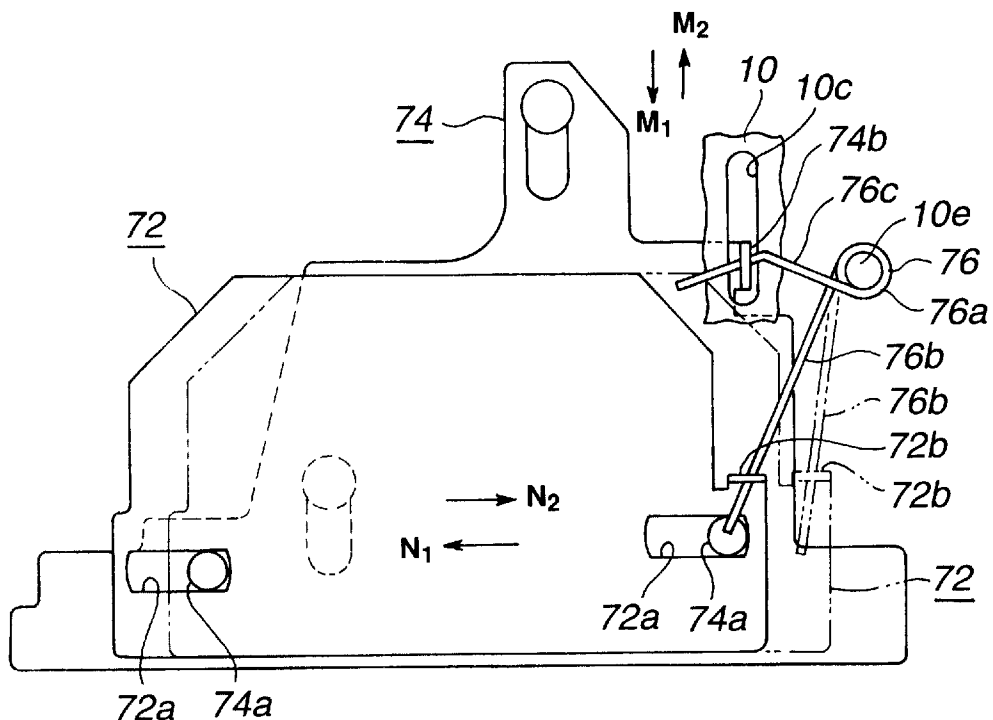
FIG. 24 is a plan view showing the operation of a torsion spring where the lock base is moved.

On the surface of the chassis 10 in the side opposite to the side where the operation lever 66 and the lock base 72 are supported, as shown in FIG. 21, a head base 74 is supported to be movable in the directions of the arrows $M_1$ and $M_2$ in FIG. 24, which are directions in which the head base is moved close to and apart from the magnetic tape 4 of the tape cassette 5 attached to the attachment portion 6. First and second engage projection portions 74*a* are formed in both sides in the movement direction, on the head base 74, as shown in FIG. 21. Further, second insertion holes 10*c* each having a long diameter in the movement direction of the head base 74 are formed in the chassis 10 so as to correspond to the first and second engage projection portions 74*a*. The head base 74 is supported to be movable in the directions of the arrows $M_1$ and $M_2$ in FIG. 24 such that the first and second engage projections 74*a* are respectively inserted through the second insertion holes 10*c* and such that the top end portion of the bead base is engaged with the engage holes 72*a* formed in the lock base 72. As shown in FIGS. 23 and 24, a spring hang piece 74*b* is formed in one side of the head base 74 in the base end portion side thereof, and this spring hang piece 74*b* is inserted in the positioning hole 10*d* formed in the chassis 10. Further, a magnetic head 75 which has slidable contact on the magnetic tape 4 is attached in the top end portion side of the head base 74.

A torsion coil spring 76 is hung between the spring hang piece 74*b* provided on the head base 74 and the spring hang piece 72*b* provided on the lock base 72, as shown in FIG. 20. This torsion coil spring 76 moves and energizes the lock base 72 in the direction of the arrow $N_1$ in FIG. 20 in a manner in which the coil portion 76*a* is supported on the spring support portion 10*e* provided on the chassis 10 and the first arm portion 76*b* is engaged on the spring hang piece 72*b* provided on the lock base 72. The torsion coil spring 76 also moves and energizes the head base 74 in the direction of the arrow $M_1$ in FIG. 20 in a manner in which the second arm portion 76*c* is engaged on the spring hang piece 74*b* of the head base 74.

Figure 25:
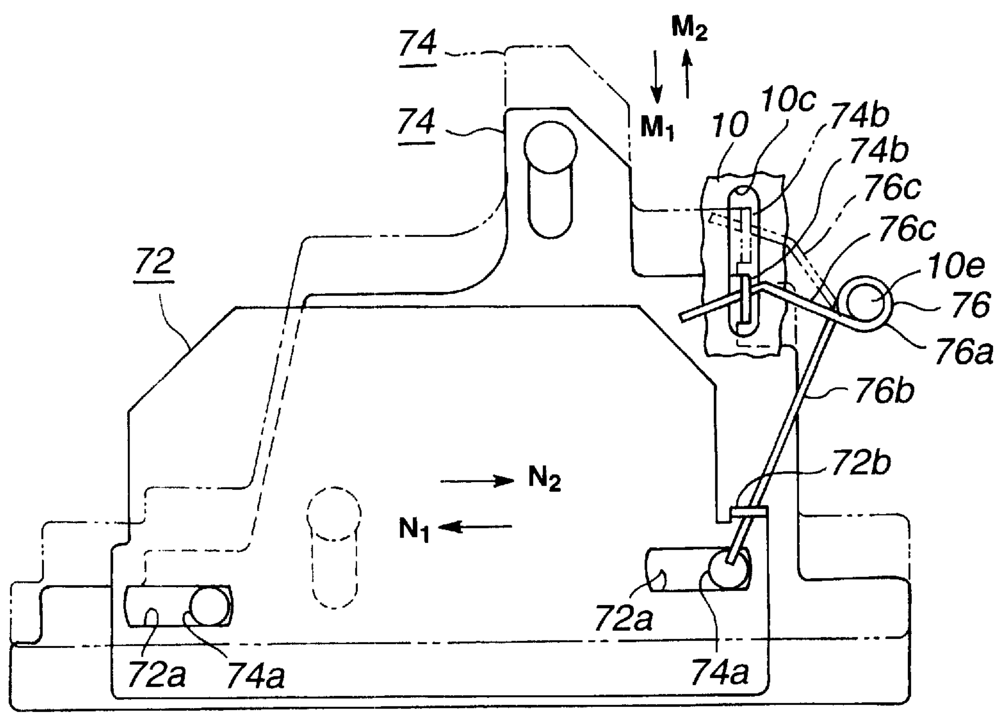
FIG. 25 is a plan view showing a state where the head base is moved.

That is, the lock base 72 receives an energizing force of the torsion coil spring 76 and is thereby moved and energized in the direction opposite to the direction of the forced release in which the contact between the magnetic tape 4 and the magnetic head 75 is released in the direction of the arrow $N_1$ in FIGS. 24 and 25. Also, the head base 74 receives the energizing force from the torsion coil spring and is thereby energized to move in the direction in which the magnetic head 75 is moved apart from the magnetic tape 4 in the direction of the arrow $M_1$ in FIGS. 24 and 25.

The lock base 72 receives an energizing force from the torsion coil spring 76 and is thereby moved in the direction of the arrow $N_1$ in FIG. 24 from the position indicated by the two-dot chain line in FIG. 24 to which it has been moved in the direction of the arrow $N_2$ in FIG. 24 and limited thereto.

Also, the head base 74 receives an energizing force from the torsion coil spring 76 and is thereby moved in the direction of the arrow $M_1$ in FIG. 25 from the position indicated by the two-dot chain line in FIG. 25 to which it has been moved in the direction of the arrow $M_2$ in FIG. 25 and limited.

As described above, on the head base 74 which receives the energizing force of the torsion coil spring 76 and is energized to move in the direction in which the magnetic head 75 is moved apart from the magnetic tape 4, as shown in FIG. 21, a slide base 77 is supported to be movable in the direction of the arrows $T_1$ and $T_2$ in FIG. 21. This slide base 77 has a main piece portion 78 elongated in the movement direction and a movement operation piece 79 formed so as to project from one side of the center portion of the main piece portion 78 in the lateral direction thereof. A pair of supported holes 78*a* each having a longer diameter in the lengthwise direction of the main piece portion 78 are formed at both ends of the main piece portion 78 in the lengthwise direction thereof. Also, first and second cam holes 78*b* having shapes symmetrical to each other are formed at both end portions of the main piece portion 78 in the lengthwise direction thereof. The first cam hole 78*b* comprises a lower horizontal portion 78*d* positioned in the lower side of FIG. 26 and extending in the lengthwise direction of the main piece portion 78, a slanting portion 78*e* inclined to be continuous to the lower horizontal portion 78*d*, and an upper horizontal portion 78*f* continuous to the slanting portion 78*e* in the lengthwise direction of the main piece portion 78. The second cam hole 78*c* comprises a lower horizontal portion 78*g* positioned in the lower side of FIG. 26 and extending in the lengthwise direction of the main piece portion 78, a slanting portion 78*h* inclined and continuing from the lower horizontal portion 78*g*, and an upper horizontal portion 78*i* continuous to the slanting portion 78*h* in the lengthwise direction of the main piece portion 78. The lower horizontal portion 78*d* formed at the first cam hole 78*b* and the lower horizontal portion 78*g* formed at the second cam hole 78*c* are formed to be positioned at an equal height, as well as the upper horizontal portion 78*f* formed at the first cam hole 78*b* and the lower horizontal portion 78*i* formed at the second cam hole 78*c*.

The slide base 77 is supported to be movable in the directions of the arrows $T_1$ and $T_2$ in FIG. 21 within the ranges of the supported holes 78*a* by supporting the supported holes 78*a* through the caulking portions 74*c* formed at the head base 74.

Further, on the chassis 10, first and second pinch roller support arms 80L and 80R are supported to be rotatable through support shafts 80*a* and 80*b* which having base end portions standing on the chassis 10. At the top end portions of the first and second pinch roller support arms 80L and 80R, pinch rollers 81 are supported to be rotatable through support shafts. Also, at the top end portions of the first and second pinch roller support anus 80L and 80R, there are provided engage projections 82L and 82R which are engaged in the first and second cam holes 78*b* and 78*c* provided in the slide base 77, respectively.

An engage hole 79*a* having a longer diameter in the vertical direction in the figure which is the direction perpendicular to the movement direction of the slide base 77 is formed in the movement operation piece 79 provided on the slide base 77. The small diameter portion 69*b* of the engage projection 69 provided on the operation lever 66 is engaged in the engage hole 79*a*, as shown in FIG. 23. Since the engage projection portion 69 of the operation lever 66 is thus engaged in the engage hole 79*a* of the slide base 77, the slide base 77 is moved in the direction of the arrows $T_1$ or $T_2$ in FIG. 21 in relation to the head base 74, in accordance with rotation of the operation lever 66. Since the head base 74 is moved in the vertical directions of the arrows $M_1$ and $M_2$ in FIG. 21 together with the lock base 72, as described above, the slide base 77 supported on the head base 74 is also moved in the vertical directions of the arrows $M_1$ and $M_2$ in FIG. 21.

The magnetic head 75 is attached to the head base 74 through a rotation support mechanism not shown, with a slight distance maintained from the slide base 77. This magnetic head 75 is operated to rotate in cases where the FWD reproducing mode is selected and where the REV reproducing mode is selected.

Also, since a clearance hole not shown is formed so as to correspond to the portion where a mount shaft is positioned, interference between the magnetic head 75 and the slide base 77 is prevented even when the slide base 77 is moved in relation to the head base 74.

Next, explanation will be made of the operation of the tape drive mechanism and the operation modes of the tape player 1 selected in accordance with the operation of the tape drive mechanism.

Explained first will be the FWD reproducing mode. The FWD reproducing mode is formed when the mode switch lever 49 is moved in the direction of the arrow $G_1$ in FIG. 9 from the position in the FF mode, the REV reproducing mode, or the REW mode. The following explanation will be made supposing a case where the mode switch lever 49 is moved in the direction of the arrow $G_1$ in FIG. 9 from the position in the FF mode to select the FWD reproducing mode.

In the tape player 1 according to the present invention, when the mode operation keys 12 for selecting various operation modes, which are provided on the upper surface of the cover member 3, are operated so as to select the FWD reproducing mode, the drive motor 31 is driven to rotate in the direction of the arrow $D_1$ in FIGS. 9 to 12, so the mode switch lever 49 is moved by rotation of the cam gear 37 and detection of respective operation modes is performed by the mode detection switch 50. The stop position of the mode switch lever 49 is detected by the mode detection switch 50, and then, a detection signal thereof is supplied to a microcomputer not shown but provided in the body section 2. By a command signal outputted from the microcomputer, based on the detection signal, the drive motor 31 is driven to rotate in the direction of the arrow $D_2$ in FIGS. 9 to 12, so the magnetic tape 4 contained in the tape cassette 5 attached to the attachment section 6 is let travel through rotation of the clutch gear 39 or the like.

Explained next will be a state in which the FWD reproducing mode is selected, in the tape player 1 according to the present invention.

When a mode selection key 12 provided on the upper surface of the cover member 3 is operated to select the FWD reproducing mode, the drive motor 31 is driven to rotate in the direction of the arrow $D_1$ in FIG. 9. The first fly wheel 32L is rotated in the direction of the arrow $D_1$ in FIG. 9 by the rotation of the drive motor 31 in the direction of the arrow $D_1$ in FIG. 9, and the transmission gear 36 engaged with the first fly wheel 32L is rotated in the clockwise direction of the direction $U_1$ in FIGS. 9 to 13 and is moved in the direction toward the cam gear 37 in accordance with the rotation direction of the first fly wheel 32L, thereby engaging the small gear portion 36*b* with the cam gear 37.

The cam gear 37 is engaged with the small gear portion 36*b* and is thereby rotated in the anti-clockwise direction of the direction $E_1$ in FIG. 13, so the mode switch lever 49 having a first slide contact projection 49*d* or a second slide contact projection 49*e* engaged in the cam groove 38 of the cam gear 37 is moved in the direction of the arrow $G_1$ or $G_2$ in FIG. 9. When the mode switch lever 49 is moved in the direction of the arrow $G_1$ or $G_2$ in FIG. 9 and the position of the mode switch lever 49 corresponding to the FWD reproducing mode is detected by the mode detection switch 50, the drive motor 31 is stopped on the basis of a command signal outputted from the microcomputer, and the mode switch lever 49 is stopped at the position corresponding to the FWD reproducing mode, i.e., the position where the lever 49 is moved most in the direction of the arrow $G_1$ in FIG. 9.

When the mode switch lever 49 is positioned at the position where the FWD reproducing mode is selected in FIG. 9, the engage projection 53*b* of the push-up lever 52 is positioned at the first horizontal portion 48*h* of the first cam hole 49*b* of the mode switch lever 49, and the push-up lever 52 is positioned at the end of the rotation in the clockwise direction of the arrow $J_2$ in FIGS. 9 and 18. As the conversion lever 55 is thus rotated in the direction $L_2$ in FIG. 9 and the push-up lever 52 is rotated in the direction of the arrow $J_2$ in FIGS. 9 and 18, the large diameter gear portion 61 of the conversion gear 59 supported on the conversion lever 55 is moved in the direction toward the first reel base 65L and the conversion gear 59 receives the energizing force from the compression coil spring 62, so the conversion gear 59 is kept moved close to the chassis 10 in the direction of the arrow K2 in FIG. 18. At this time, the large diameter gear portion 61 is engaged with the gear portion 65*a* of the first reel base 65L and with the small gear 41 of the clutch gear 39, and the small diameter gear portion 60 is kept engaged with no gear.

When the mode switch lever 49 is at the position for selecting the FWD reproducing mode as shown in FIG. 9, the operation lever 66 is pressed by the first standing piece 49*f* of the mode switch lever 49, to be thereby positioned to the rotation end in the clockwise direction in the direction of the arrow $P_1$ in FIG. 9.

By the rotation of the operation lever 66 in the direction of the arrow $P_1$ in FIG. 9, the lock base 72, the head base 74, and the slide base 77 are moved. This state will be explained with reference to FIG. 26. In FIGS. 26 to 30, the operation lever 66 is indicated by a two-dot chain line, and the lock base 72 is indicated by a continuous line. Also, the head base 74 and the magnetic head 75 are indicated by one-dot chain lines, and the slide base 77, the first and second pinch rollers 80L and 80R, the FWD capstan 34F, and the REV capstan 34R are indicated by dot lines.

Figure 26:
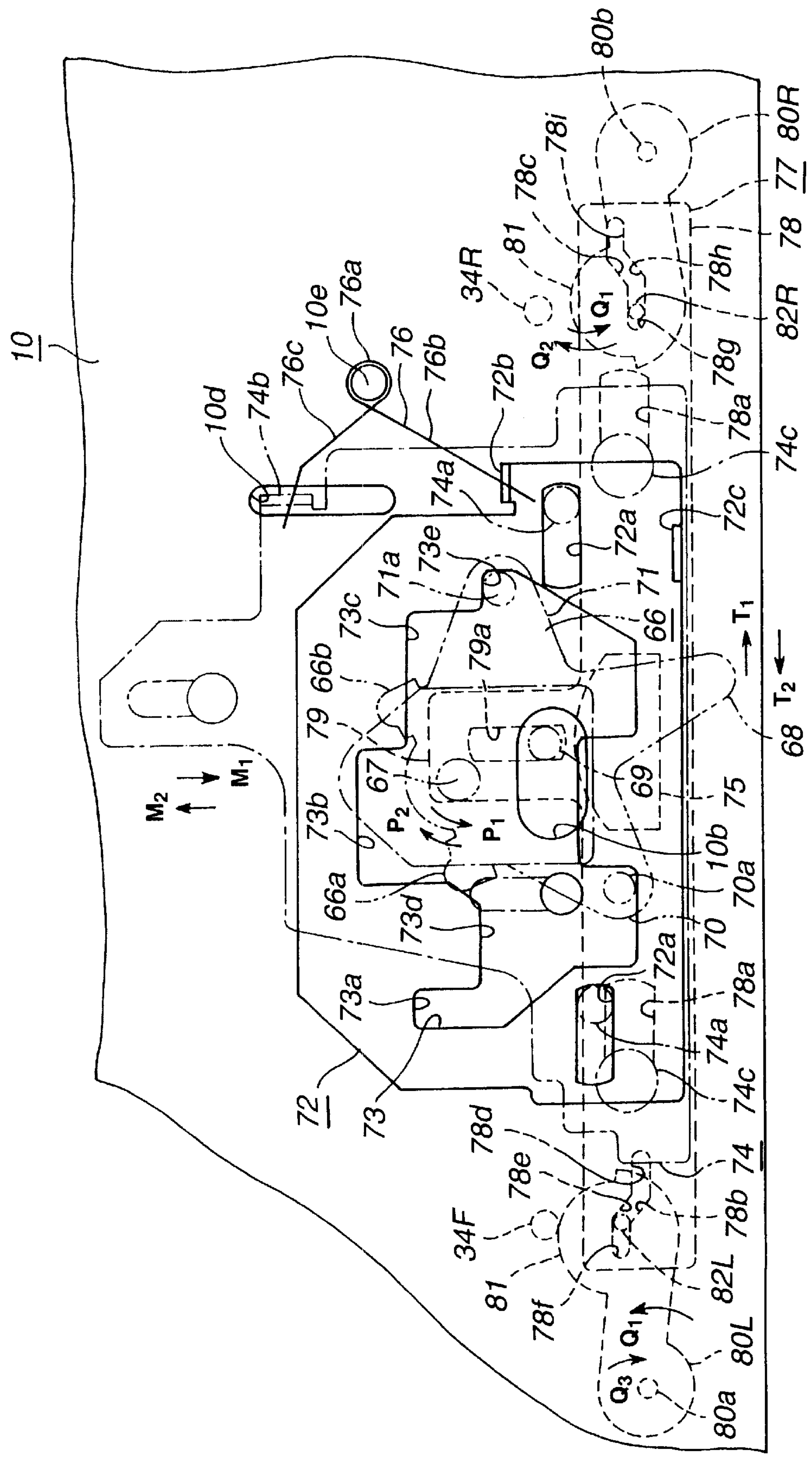
FIGS. 26 to 30 are views for explaining the operation of forced release of the lock base, by which contact between a magnetic head and a magnetic tape is forcedly released.

When the operation lever 66 is rotated in the anti-clockwise direction in the direction of the arrow $P_1$ in FIGS. 9 and 26, the second pressure projection 71*a* provided on the second pressure piece 71 presses the second pressed portion 73*e* of the lock base 72 in the direction $M_2$ in FIG. 26, thereby to move the lock base 72 in the direction $M_2$ in FIG. 26 against the energizing force of the torsion coil spring 76.

In this state, since the engage projection portions 74*a* are engaged in the engage holes 72*a* provided in the lock base 72, the bead base 74 is moved together with the lock base 72, in the direction of the arrow $M_2$ in FIG. 26, so the magnetic head 75 attached to the head base 74 is thereby positioned so as to have contact with the magnetic tape 4 of the tape cassette 5 attached to the attachment section 6.

Also, when the operation lever 66 is rotated in the direction of the arrow $P_1$ in FIGS. 9 and 26, the slide base 77 is moved in the direction of the arrow $T_1$ in FIG. 26 in relation to the head base 74, since the engage projection 69 provided on the operation lever 66 is engaged in the engage hole 79*a* provided in the slide base 77. At this time, the head base 74 is moved in the direction of the arrow $M_2$ in FIG. 26, so the slide base 77 is moved in accordance with the movement of the head base 74 and is rotated in the direction of the arrow $T_1$ in FIG. 26 by the rotation of the operation lever 66.

When the slide base 77 is moved in the direction of the arrow $M_2$ in FIG. 26, the first and second pinch roller support arms 80L and 80R are respectively rotated about the support shafts 80*a* and 80*b*, with the engage projections 82L and 82R engaged in the first and second cam holes 78*b* and 78*c*. At this time, as the slide base 77 is moved in the direction of the arrow $T_1$ in FIG. 26, the engage projection 82L provided on the pinch roller support arm 80L is positioned at the upper horizontal portion 78*f* of the first cam hole 78*b*, and the engage projection 82R of the second pinch roller support arm 80R is positioned at the lower horizontal portion 78*g* of the first cam hole 78*c*. That is, the first pinch roller support arm 80L is rotated greatly in the direction of the arrow $Q_1$ in FIG. 26, to be pressed into contact with the FWD capstan 34F. The arm 80L together with the capstan 34F pinches the magnetic tape 4 and lets the magnetic tape 4 travel at a constant speed in the first traveling direction which is the forward direction from a tape reel to another tape reel. At this time, the second pinch roller support arm 80R is not rotated in the direction of the arrow $Q_2$ in FIG. 26 but is set at the initial position apart from the REV capstan 34R.

As described above, when the mode switch lever 49 is operated and moved and the reproducing operation mode is thereby set, the drive motor 31 once stopped is driven to rotate in the direction of the arrow $D_2$ in FIG. 9, and the first fly wheel 32L is rotated in the direction of the arrow $F_2$ in FIG. 9. The transmission gear 36 engaged with the first fly wheel 32L is then rotated in the anti-clockwise direction in the direction $U_2$ in FIGS. 9 and 13 and is moved along the rotation direction of the first fly wheel 32L in the direction in which the gear 36 is moved apart from the cam gear 37, so the intermediate gear portion 36*c* is engaged with the large gear 40 of the clutch gear 39. Specifically, the drive force of the drive motor 31 is transmitted to the clutch gear 39 through the first fly wheel 32L and the transmission gear 36, so the clutch gear 39 is rotated in the direction of the arrow $W_1$ in FIGS. 9 and 14 and the first reel base 65L is rotated in the anti-clockwise direction in the direction of the arrow $R_5$ through the conversion gear 55 engaged with the small gear 41 forming part of the clutch gear 39.

In this state, since the large diameter gear portion 61 of the conversion gear 55 is engaged with the small gear 41 of the clutch gear 39, as shown in FIG. 19, the first reel base 65L is rotated at a low speed, based on the gear ratio. Further, the FWD capstan 34F rotated in the clockwise direction in FIG. 26, so the magnetic tape 4 travels in the first traveling direction in which the magnetic tape 4 travels from one tape reel to the other tape reel. Information signals recorded on the magnetic tape 4 are recorded or reproduced while the magnetic tape 4 is wound up on the other tape reel engaged with the first reel base 65L.

Explained next will the FF mode in which the magnetic tape 4 travels at a high speed from one tape reel to the other tape reel. The FF mode is formed in case where the mode switch lever 49 is moved in the direction to the left side in the direction of the arrow $G_2$ in FIG. 9 from the position of the FWD reproducing mode or where the mode switch lever 49 is moved in the direction to the right side in the direction of the arrow $G_1$ in FIG. 9 from the position of the REV reproducing mode or the REW mode. The following explanation of the FF mode will be made of the case where the mode switch lever 49 is moved in the direction of the arrow $G_2$ in FIG. 9 from the position of the FWD reproducing mode shown in FIG. 9.

At first, the mode selection keys 12 for selecting various operation modes, which are provided on the upper surface of the cover member 3, are operated and operation of selecting the FF mode is carried out. Then, the drive motor 31 is driven to rotate in the anti-clockwise direction of the arrow $D_1$ in FIG. 10. As the drive motor 31 is thus driven to rotate in the direction of the arrow $D_1$ in FIG. 10, the first fly wheel 32L is rotated in the anti-clockwise direction in the direction of the arrow $F_1$ in FIG. 10, so the small gear portion 36*d* of the transmission gear 36 engaged with the first fly wheel 32L is engaged with the cam gear 37.

The cam gear 37 is engaged with the small gear portion 36*b* and is thereby rotated in the anti-clockwise direction in the direction of the arrow $E_1$ in FIG. 13, so the mode switch lever 49 is moved in the direction of the arrow $G_2$ in FIG. 10, and the position of the mode switch lever 49 corresponding to the FF mode is detected by the mode detection switch 50. The motor 31 is then stopped and the mode switch lever 49 is stopped at the position corresponding to the FF mode.

When the mode switch lever 49 is thus stopped at the position where the FF mode is selected, the engage projection 57*a* of the conversion lever 55 is positioned at the right end of the left horizontal portion of the second cam hole 49*c* of the mode switch lever 49, so the conversion lever 55 is maintained at the position where it is rotated in the anti-clockwise direction in the direction of the arrow $L_2$ in FIG. 10.

When the mode switch lever 49 is moved to the position where the FF mode is selected, the engage projection 53*b* of the push-up lever 52 is positioned at the upper horizontal portion 49*j* of the first cam hole 49*b* of the mode switch lever 49, so the push-up lever 52 is rotated in the anti-clockwise direction in the direction of the arrow $J_1$ in FIG. 10. The conversion lever 55 is positioned at the rotation end in the direction of the arrow $L_1$ in FIG. 10, and the push-up lever 52 is rotated in the anti-clockwise direction in the direction of the arrow $J_1$ in FIG. 10, so the engagement between the large diameter gear portion 61 of the conversion gear 59 supported on the conversion lever 55 and the first reel base 65L in the left side is maintained, and the conversion gear 59 is moved by the push-up lever 52 in the direction of the arrow $K_1$ in FIG. 18 in which the conversion gear 59 is moved apart from the chassis 10. Accordingly, the engagement between the large diameter gear portion 61 of the conversion gear 59 and the gear portion 65*a* of the first reel base 65L is maintained, and the small diameter gear portion 60 is engaged with the large gear 40 of the clutch gear 39.

When the mode switch lever 49 is moved to and situated at the position where the FF mode is selected, the operation lever 66 is in the state before it is rotated, i.e., in the initial position as shown in FIG. 20 where the pressure projections 70*a* and 71*a* are respectively in contact with the first pressed portion 73*d* and the second pressed portion 73*e* of the lock base 72. In the state in which the FF mode is selected, the operation lever 66 is at the initial position, so the pressing of the second pressed portion 73*e* by the pressure projection 71*a* is released. Therefore, the lock base 72 receives the energizing force from the torsion coil spring 76 and is thereby moved in the direction of the arrow $M_1$ in FIG. 20, to reach the initial position. Together with this lock base 72, the head base 74 is moved in the direction of the arrow $M_1$ in FIG. 20, so the magnetic head 75 mounted on the head base 74 is set at the position distant from the magnetic tape 4. Also, the operation lever 66 is rotated to the initial position, and the slide base 77 is moved together with the head base 74 in one same direction due to the movement of the head base 74 in the direction of the arrow $M_1$ in FIG. 20. Thereby, the first and second pinch roller support arms 80L and 80R engaged with the slide base 77 are rotated to recover the initial position, so the pinch rollers 81 are respectively moved apart from the FWD capstan 34F and the REV capstan 34R, thereby to release the pinching of the magnetic tape 4.

As has been described above, the mode switch lever 49 is operated and moved by the drive motor 31, and this movement to the position where the FF mode is selected is detected by the mode detection switch 50. When the setting of the FF mode is thus detected, the drive motor 31 starts rotating in the direction of the arrow $D_2$ in FIG. 10. By this driving of the drive motor 31, the first fly wheel 32L is rotated in the clockwise direction in the direction of the arrow $F_2$ in FIG. 10, and the transmission gear 36 engaged with the small diameter gear portion 32*a* of the first fly wheel 32L is rotated in the anti-clockwise direction in the direction of the arrow $U_2$ in FIG. 10 and is also moved in the direction in which the gear 36 is moved apart from the cam gear 37, so the intermediate gear portion 36*c* is engaged with the large gear 40 of the clutch gear 39. Further, the driving force of the drive motor 31 is transmitted to the clutch gear 39 through the first fly wheel 32L and the transmission gear 36. Accordingly, the clutch gear 39 is rotated in the clockwise direction, and the clutch gear 39 is moved in the clockwise direction in the direction of the arrow $W_1$ in FIG. 10, so the first reel base 65L engaged with the conversion gear 55 is rotated in the clockwise direction in the direction of the arrow $R_5$ in FIG. 10, through the conversion gear engaged with the large gear 40 of the clutch gear 39.

In this case, since the small gear portion 60 of the conversion gear 55 is engaged with the large gear 40 of the clutch gear 39, the first reel base 651 is rotated at a high speed, based on the gear ratio. Further, since the first reel base 651 is rotated at a high speed, the magnetic tape 4 is let travel from one tape reel toward the other tape reel.

Next, the state where the REW mode is set will be explained. The REW mode is formed in case where the mode switch lever 49 is moved in the direction of the arrow $G_2$ in FIG. 11 from the position of the FWD reproducing mode or the FF mode or where the lever 49 is moved to the right side in the direction of the arrow $G_2$ from the position of the REV reproducing mode. The following explanation of the REW mode will be made of the case where the mode switch lever 49 is moved in the direction of the arrow $G_2$ in FIG. 11 from the position of the FF mode.

At first, the mode selection keys 12 for selecting various operation modes, which are provided on the upper surface of the cover member 3, are operated and operation of selecting the REW mode is carried out. Then, the drive motor 31 is driven to rotate in the anti-clockwise direction of the arrow $D_1$ in FIG. 11, and the first fly wheel 32L is rotated in the anti-clockwise direction in the direction of the arrow $F_1$ in FIG. 11, so the small gear portion 36*b* of the transmission gear 36 engaged with the first fly wheel 32L is engaged with the cam gear 37. The cam gear 37 is engaged with the small gear portion 36*b* and is thereby rotated in the anti-clockwise direction in the direction of the arrow $E_1$ in FIG. 11, so the mode switch lever 49 is moved toward the left side in the direction of the arrow $G_2$ in FIG. 10. Further, when the mode detection switch 50 detects that the mode switch lever 49 has been moved to the position where the REW mode is selected, the motor 31 is stopped and the mode switch lever 49 is stopped at the position corresponding to the REW mode.

Figure 11:
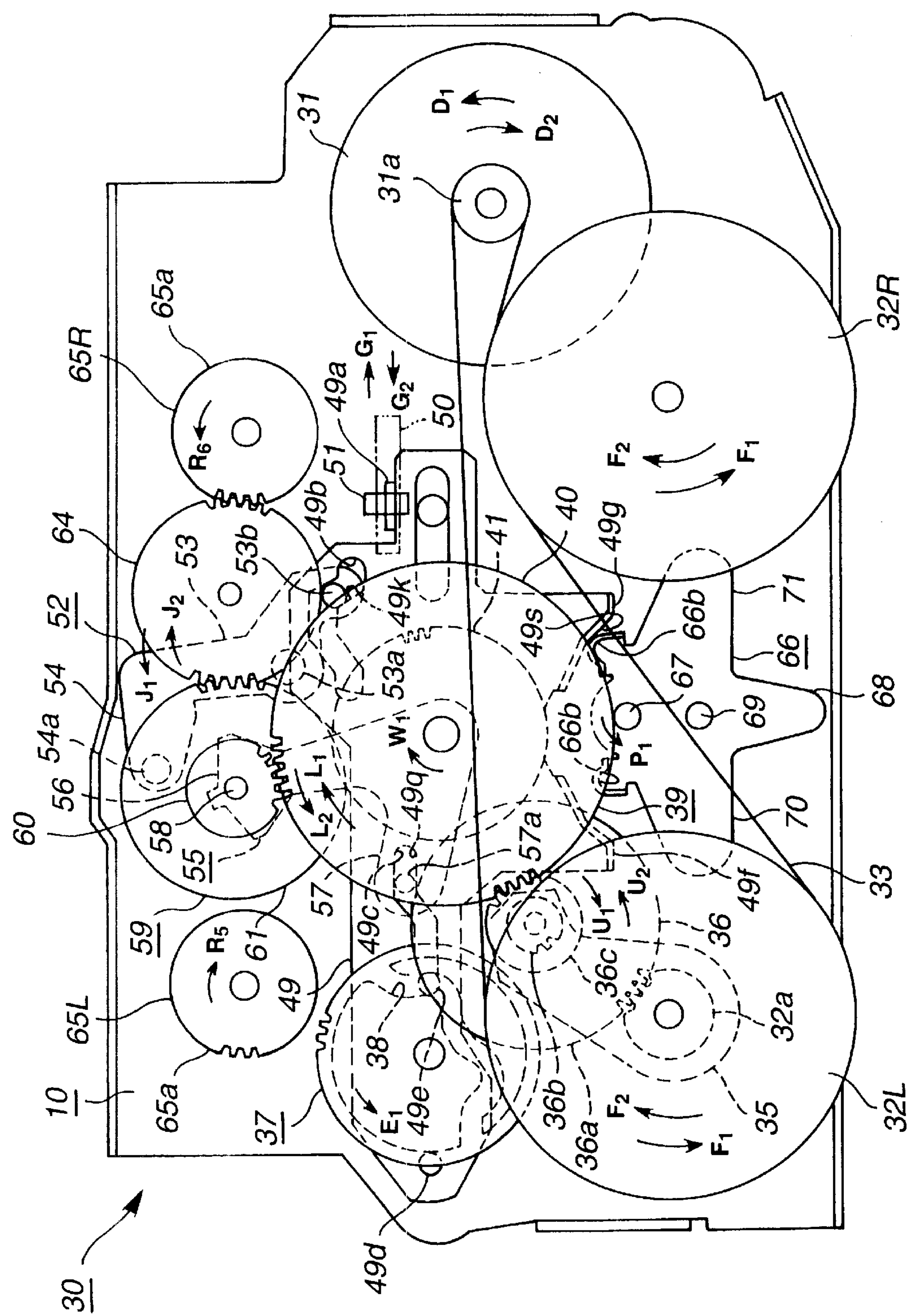
FIG. 11 is a plan view showing the tape drive mechanism where the REW mode is selected.

When the mode switch lever 49 is thus moved to the position where the REW mode is selected, the engage projection 57*a* of the conversion lever 55 is positioned above the horizontal portion 49*o* in the right side of the second cam hole 49*c* provided in the mode switch lever 49, so the conversion lever 55 is rotated in the clockwise direction in the direction of the arrow $L_2$ in FIG. 11. Also, when the mode switch lever 49 is moved to the position where the REW mode is selected, the engage projection 53*b* of the push-up lever 52 is positioned at the top end portion of the slanting portion 49$k$ in the right side of the first cam hole 49$b$ of the mode switch lever 49, so the push-up lever 52 is kept rotated in the anti-clockwise direction in the direction of the arrow $J_1$ in FIG. 11.

Thus, the conversion lever 55 is kept rotated in the clockwise direction of the arrow $L_2$ in FIG. 11 and the push-up lever 52 is kept rotated in the anti-clockwise direction in the direction of the arrow $J_1$ in FIG. 11, so the large diameter gear portion 61 of the conversion gear 59 supported on the conversion lever 55 is engaged with the second reel base 65R through the slave gear 64, and the conversion gear 59 is moved by the push-up lever 52 in the direction of the arrow $K_1$ in FIG. 18 in which the conversion gear 59 is moved apart from the chassis 10. The large diameter gear portion 61 of the conversion gear 59 is engaged with the gear portion 65$a$ of the second reel base 65R through the slave gear 64, and the engagement between the small diameter gear portion 60 and the large gear 40 of the clutch gear 39 is maintained.

Meanwhile, also when the mode switch lever 49 is moved to and situated at the position where the REW mode is selected, the operation lever 66 is kept positioned at the initial position where the first and second pressure pieces 66$a$ and 66$b$ are not pressed by the first standing pieces 49$f$ and 49$g$. Therefore, the magnetic head 75 is kept positioned apart from the magnetic tape 4, and the pinch rollers 81 provided on the first and second pinch roller support arms 80L and 80R are moved apart from the FWD capstan 34F and the REV capstan 34R, so the magnetic tape 4 is kept not pinched by the pinch rollers 81, the FWD capstan 34F and the REV capstan 34R.

As has been described above, when the mode detection switch 50 detects that the mode switch lever 49 is moved to the position where the REW mode is selected, the drive motor 31 is driven to rotate in the clockwise direction of the arrow $D_2$ in FIG. 11. As the second fly wheel 32R is rotated in the direction of the arrow $F_1$ in FIG. 11, the first fly wheel 32L is rotated in the clockwise direction in the direction of the arrow $F_2$ in FIG. 11, and the transmission gear 36 engaged with the first fly wheel 32L is rotated in the anti-clockwise direction in the direction of the arrow $U_2$ in FIG. 11 and is also moved in the direction in which the gear 36 is moved apart from the cam gear 37, so the intermediate gear portion 36$c$ is engaged with the large gear 40 of the clutch gear 39.

When the REW mode is set, the drive force of the drive motor 31 is transmitted to the clutch gear 39 through the first fly wheel 32L and the transmission gear 36, and the clutch gear 39 is rotated in the clockwise direction in the direction $W_1$ in FIG. 11. As the clutch gear 39 thus rotates in the direction $W_1$ in FIG. 11, the rotation torque is transmitted to the second reel base 65R from the slave gear 64 through the conversion gear 55 engaged with the large gear 40 provided on the clutch gear 39, and the second reel base 65R is rotated in the anti-clockwise direction in the direction of the arrow $R_6$ in FIG. 11. At this time, the small diameter gear portion 60 of the conversion gear 55 is engaged with the large gear 40 of the clutch gear 39, and therefore, the second reel base 65R is rotated at a high speed. Further, since the second reel base 65R is rotated in the direction of the arrow $R_6$ in FIG. 11, the magnetic tape 4 is let travel at a high speed to a tape reel from the other tape reel.

Next, the state where the REW mode is set will be explained with reference to FIG. 12.

Figure 12:
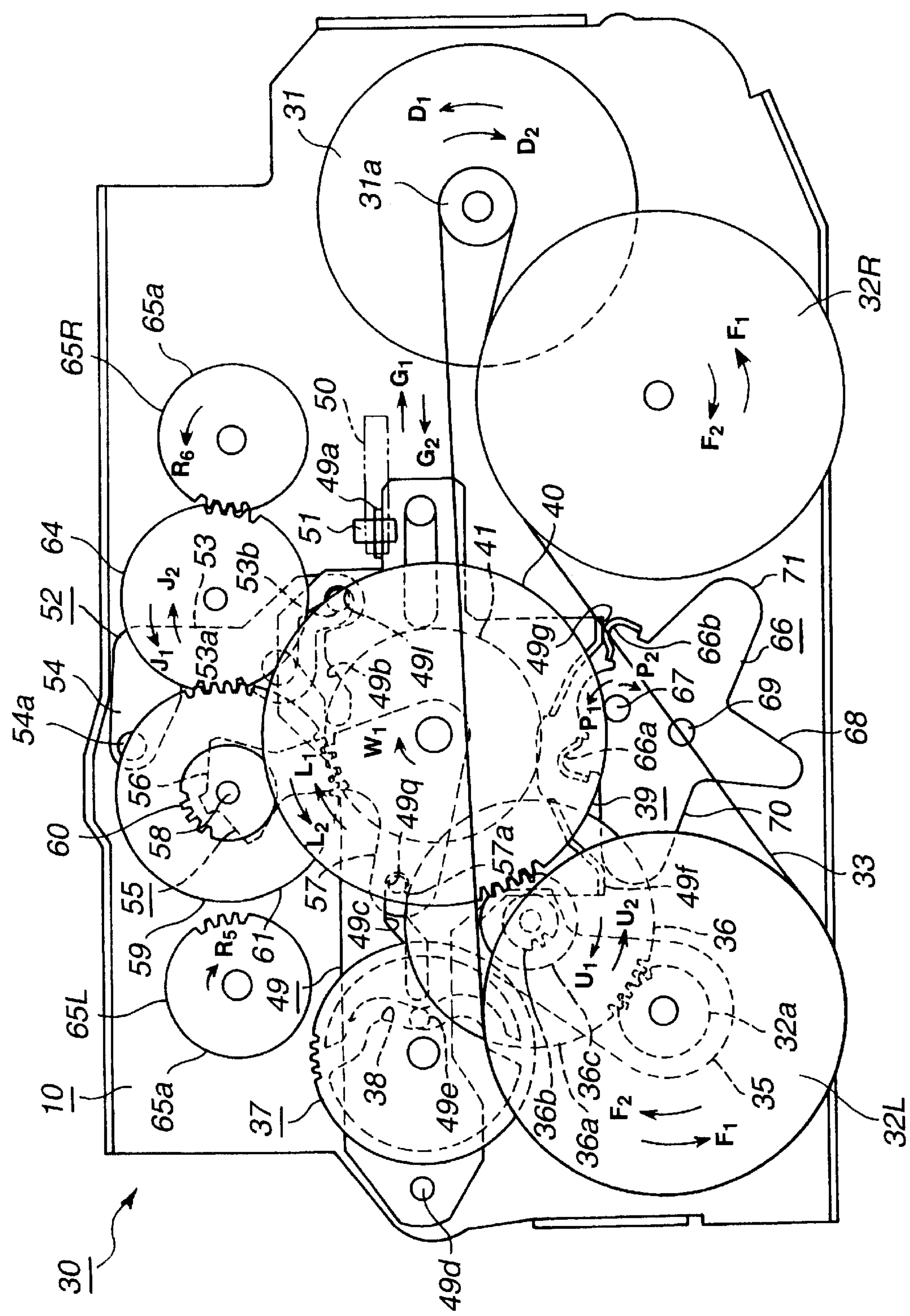
FIG. 12 is a plan view showing the tape drive mechanism where the REV reproducing mode is selected.

The REW mode is formed in case where the mode switch lever 49 is moved to the left side in the direction of the arrow $G_1$ in FIG. 12 from the position of the FWD reproducing mode, the FF mode, or the REW mode. The following explanation will be made of the case where the REV reproducing mode is set when the mode switch lever 49 is moved in the direction of the arrow $G_2$ in FIG. 12 from the position where the REW mode is set.

The mode selection keys 12 for selecting various operation modes, which are provided on the upper surface of the cover member 3, are operated, and the operation of selecting the REV reproducing mode is carried out. Then, the drive motor 31 is driven to rotate in the anti-clockwise direction of the arrow $D_1$ in FIG. 12, and the first fly wheel 32L is rotated in the anti-clockwise direction in the direction of the arrow $F_1$ in FIG. 12, so the small gear portion 36$b$ of the transmission gear 36 engaged with the first fly wheel 32L is engaged with the cam gear 37. The cam gear 37 is engaged with the small gear portion 36$b$ and is thereby rotated in the anti-clockwise direction in the direction of the arrow $E_1$ in FIG. 12, so the mode switch lever 49 is moved toward the left side in the direction of the arrow G2 in FIG. 12. Further, when the mode detection switch 50 detects that the mode switch lever 49 has been moved to the position where the REV reproducing mode is selected, the drive motor 31 is stopped and the mode switch lever 49 is stopped at the position for selecting the REV reproducing mode.

When the mode switch lever 49 is thus moved to the position where the REW mode is selected, the engage projection 57$a$ of the conversion lever 55 is positioned at the right end of the horizontal portion 49$a$ in the right side of the second cam hole 49$c$ of the mode switch lever 49, so the conversion lever 55 is rotated in the clockwise direction in the direction of the arrow $L_2$ in FIG. 12. Also, when the mode switch lever 49 is moved to the position where the REV reproducing mode is selected, the engage projection 53$b$ of the push-up lever 52 is positioned above the horizontal portion 49$l$ in the right side of the first cam hole 49$b$ of the mode switch lever 49, so the push-up lever 52 is kept rotated in the anti-clockwise direction in the direction of the arrow $J_1$ in FIG. 12.

Thus, the conversion lever 55 is kept rotated in the clockwise direction of the arrow $L_2$ in FIG. 12 and the push-up lever 52 is kept rotated in the anti-clockwise direction in the direction of the arrow $J_2$ in FIG. 12, so the large diameter gear portion 61 of the conversion gear 59 supported on the conversion lever 55 is engaged with the second reel base 65R through the slave gear 64. At this time, the conversion gear 59 is not pushed up by the push-up lever 52 but receives the energizing force from the compression coil spring 62 and is moved in the direction of the arrow $K_2$ in FIG. 19 in which the conversion gear 59 is moved close to the chassis 10. That is, the conversion gear 59 is kept engaged with the small gear 40 of the clutch gear 39, by engaging the large diameter gear portion 61 with the gear portion 65$a$ of the second reel base 65R through the slave gear 64.

Meanwhile, when the mode switch lever 49 is moved to and situated at the position where the REV mode is selected, the second pressure piece 66$b$ is pressed into contact with the standing piece 49$g$ provided on the mode switch lever 49, so the operation lever 66 is brought into a state in which it is rotated in the direction $P_2$ in FIG. 12. Since the operation lever 66 is rotated in the direction $P_2$ in FIG. 12, the lock base 72, the head base 74, and the slide base 77 are moved as shown in FIG. 28.

Figure 28:
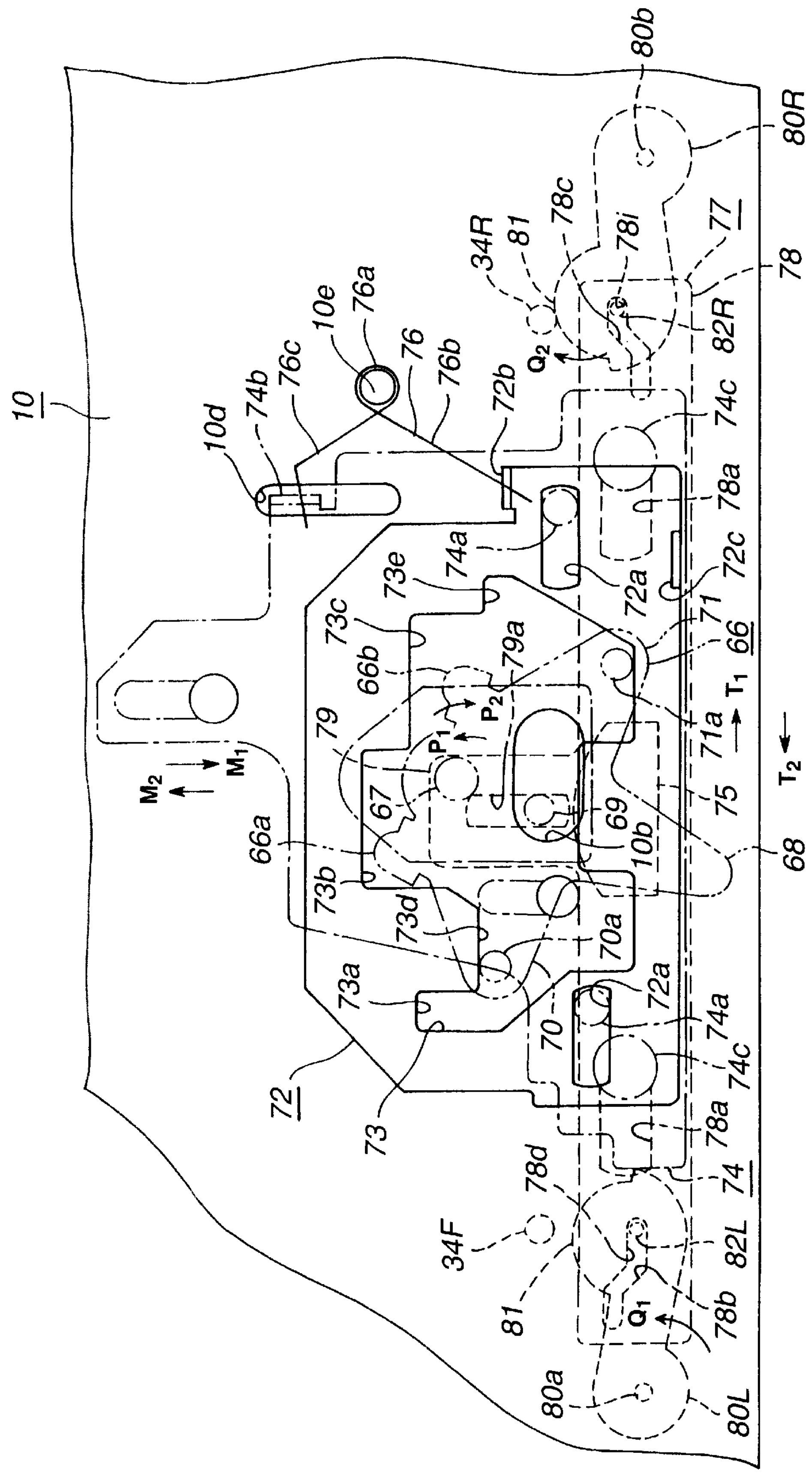

When the operation lever 66 is rotated in the clockwise direction in the direction $P_2$ in FIG. 12, the first pressure projection 70*a* presses the first pressed portion 73*d* of the lock base 72 thereby to move the lock base 72 in the direction of the arrow $M_2$ in FIG. 28, against the energizing force of the torsion coil spring 76. In accordance with the movement of the lock base 72 in the direction of the arrow $M_2$ in FIG. 28, the head base 74 is moved in the same direction of the arrow $M_2$ in FIG. 28, so the magnetic head 75 is brought into contact with the magnetic tape 4 of the tape cassette 5 attached to the attachment section 6.

Also, when the operation lever 66 is rotated in the clockwise direction in the direction of the arrow $P_2$ in FIG. 28, the slide base 77 is moved to the left side in the direction of the arrow $T_2$ in FIG. 28, in relation to the head base 74. At this time, the head base 74 is simultaneously moved in the direction of the arrow $M_2$ in FIG. 28, so the slide base 77 is moved in the direction of the arrow $M_2$ in FIG. 28 in accordance with the movement of the head base 74 and is also moved to the left side in the direction of the arrow $T_2$ in FIG. 28 by the rotation of the operation lever 66 in the direction of the arrow $P_2$ in FIG. 28.

When the slide base 77 is moved in the direction of the arrow $M_2$ in FIG. 28, the first and second pinch roller support arms 80L and 80R with the engage projections 82L and 82R engaged in the first and second cam holes 78*b* and 78*c* provided in the slide base 77 are respectively rotated about the support shafts 80*a* and 80*b*. At this time, as the slide base 77 is moved in the direction of the arrow $T_2$ in FIG. 28, the engage projection 82R provided on the pinch roller support arm 80R is positioned at the upper horizontal portion 78*i* of the second cam hole 78*c,* and the engage projection 82R provided on the first pinch roller support arm 80L is positioned at the lower horizontal portion 78*d* of the first cam hole 78*b*. That is, the second pinch roller support arm 80R is rotated greatly in the direction of the arrow $Q_2$in FIG. 28, to be pressed into contact with the REV capstan 34R. The arm 80R together with the capstan 34R pinches the magnetic tape 4 and lets the magnetic tape 4 travel at a constant speed in the second traveling direction which is the reverse direction to a tape reel from another tape reel. At this time, the first pinch roller support arm 80L is not rotated in the direction of the arrow $Q_1$ in FIG. 28 but is set at the initial position apart from the FWD capstan 34L.

As described above, when the mode detection switch 50 detects that the mode switch lever 49 has been moved to the position where the REV reproducing mode is selected, the drive motor 31 is driven to rotate in the direction of the arrow $D_2$ in FIG. 12, and the second fly wheel 32R is rotated in the direction of the arrow $F_1$ in FIG. 12. Then, the first fly wheel 32L is rotated in the clockwise direction in the direction of the arrow $F_2$ in FIG. 12, and the transmission gear 36 engaged with the first fly wheel 32L is rotated in the anti-clockwise direction in the direction $U_2$ in FIG. 12 and is also moved in the direction in which the gear 36 is moved apart from the cam gear 37, so the intermediate gear portion 36*c* is engaged with the large gear 40 of the clutch gear 39.

When the REV reproducing mode is set, the drive force of the drive motor 31 is transmitted to the clutch gear 39 through the first fly wheel 32L and the transmission gear 36, and the clutch gear 39 is rotated in the clockwise direction in the direction $W_1$ in FIG. 12. As the clutch gear 39 thus rotates in the direction $W_1$ in FIG. 12, the rotation torque is transmitted to the second reel base 65R from the slave gear 64 through the conversion gear 55 engaged with the large gear 40 provided on the clutch gear 39, and the second reel base 65R is rotated in the anti-clockwise direction in the direction of the arrow $F_1$ in FIG. 12. At this time, the large diameter gear portion 61 of the conversion gear 55 is engaged with the small gear 41 of the clutch gear 39, and therefore, the second reel base 65R is rotated at a constant speed in the direction of the arrow $R_6$ in FIG. 9. Further, since the second reel base 65R is rotated at a constant speed, the magnetic tape 4 is let travel at a constant speed to a tape reel from another tape reel, thereby performing REV reproducing.

In the tape player 1 according to the present invention, to stop the respective operation modes, a stop mode is selected and operated from the mode selection keys 12 for selecting various operation modes. Then, rotation of the drive motor 31 is stopped where the FF mode or the REW mode is set and the operation of respective operation modes is stopped.

Next explanation will be made of the operation of the forced release function of forcedly releasing the contact between the magnetic head 75 and the magnetic tape 4, as a function of the lock base 72.

At first, with reference to FIGS. 26, 27, and 30, explanation will be made of the operation where forced release is performed when the tape player 1 is in the FWD reproducing mode.

When the tape player 1 is in the FWD reproducing mode, the operation lever 66 is rotated in the anti-clockwise direction in the direction of the arrow $P_1$ in FIG. 26, and the second pressure projection 71*a* presses the second pressed portion 73*e* in the direction of the arrow $M_2$ in FIG. 26, so the lock base 72 is moved in the direction of the arrow $M_2$ in FIG. 26 against the energizing force of the torsion coil spring 76. Further, in accordance with the movement of the lock base 72 in the direction of the arrow $M_2$, the head base 74 is moved in the direction of the arrow $M_2$ in FIG. 26, and the magnetic head 75 attached to the head base 74 is in contact with the magnetic tape 4 of the tape cassette 5. At this time, a part of the magnetic head 75 is kept inserted in the tape cassette 5 although not shown in the figures.

Also, in accordance with the movement of the head base 74 in the direction of the arrow $M_2$ in FIG. 26, the slide base 77 together with the head base 74 is moved in the same direction of the arrow $M_2$ in FIG. 26 and is also moved in the direction of the arrow $T_2$ in FIG. 26 by the rotation of the operation lever 66 in the direction of the arrow $P_1$ in FIG. 26. As the slide base 77 moves in the direction of the arrow $T_2$ in FIG. 26, the pinch roller 81 supported on the pinch roller support arm 80L is pressed into contact with the FWD capstan 34F, thereby pinching the magnetic tape 4.

During this FWD reproducing operation in which the FWD reproducing mode is operated, when the power source is shut off due to an empty battery or the like, for example, the tape cassette 5 can be easily extracted from the attachment section 6 in the following manner, without turning on the power again.

At first, the release knob 13 provided on the upper cabinet half 7 is operated and moved in the direction of the arrow $B_1$ in FIG. 3. The release knob 13 is thus operated and moved in the direction of the arrow $B_1$ in FIG. 3, the lock of the cover member 3 is released as described above, and the cover member 3 is rendered rotatable in the direction in which the attachment section 6 formed in the body section 2 is opened. Also, when the release knob 13 is operated and moved in the direction of the arrow $B_1$ in FIG. 3, the pressure piece 24*b* of the connection plate 18 of the lock mechanism 15 connected with the release knob 13 presses the pressed piece 72*c* of the lock base 72 toward the right side in the direction of the arrow $N_2$ in FIGS. 20 and 26. The pressed piece 72*c* is pressed in the direction of the arrow $N_2$ in FIG. 26 by the pressure piece 24*b,* so the lock base 72 is moved in the same direction against the energizing force of the torsion coil spring 76. As the lock base 72 moves to the right side in the direction of the arrow $N_2$ in FIG. 26, the second pressed portion 73*e* which has been in contact with the second pressure projection 71*a* of the operation lever 66 slides on the pressure projection 71*a,* and relatively moves to the left side in the direction of the arrow $N_1$ in FIG. 26. When the pressed portion 73*e* has come to correspond to the second setting portion 73*c,* this slidable contact is released, so the lock base 72 is moved in the direction of the arrow $M_1$ in FIG. 26 by the spring force of the torsion coil spring 76. As shown in FIG. 27, the second pressure projection 71a is positioned in the second setting portion 73*c* of the opening portion 73 of the lock base 72.

In accordance with the movement of the lock base 72 in the direction of the arrow $M_1$ in FIG. 26, the head base 74 is moved in the same direction, and the magnetic head 75 attached to the head base 74 is moved in the direction in which the head is moved apart from the magnetic tape 4, to return back from the cassette 5. At this time, the slide base 77 together with the head base 74 moves in the direction of the arrow $M_1$ in FIG. 26, and the first pinch roller support arm 80L is rotated in the direction in which the arm 80L is moved apart from the FWD capstan 34F in the direction of the arrow $Q_3$ in FIG. 27, so the pinch roller 81 supported on the first pinch roller support arm 80L is moved apart from the FWD capstan 34F thereby releasing the pinching of the magnetic tape 4.

In this state, the cover member 3 is rotated to the position where the attachment section 6 is opened, so the tape cassette 5 attached to the attachment section 6 and the magnetic tape 4 contained in the tape cassette 5 can be extracted without contacting the magnetic head 75, the first pinch roller support arm 80L, and the like.

Figure 27:
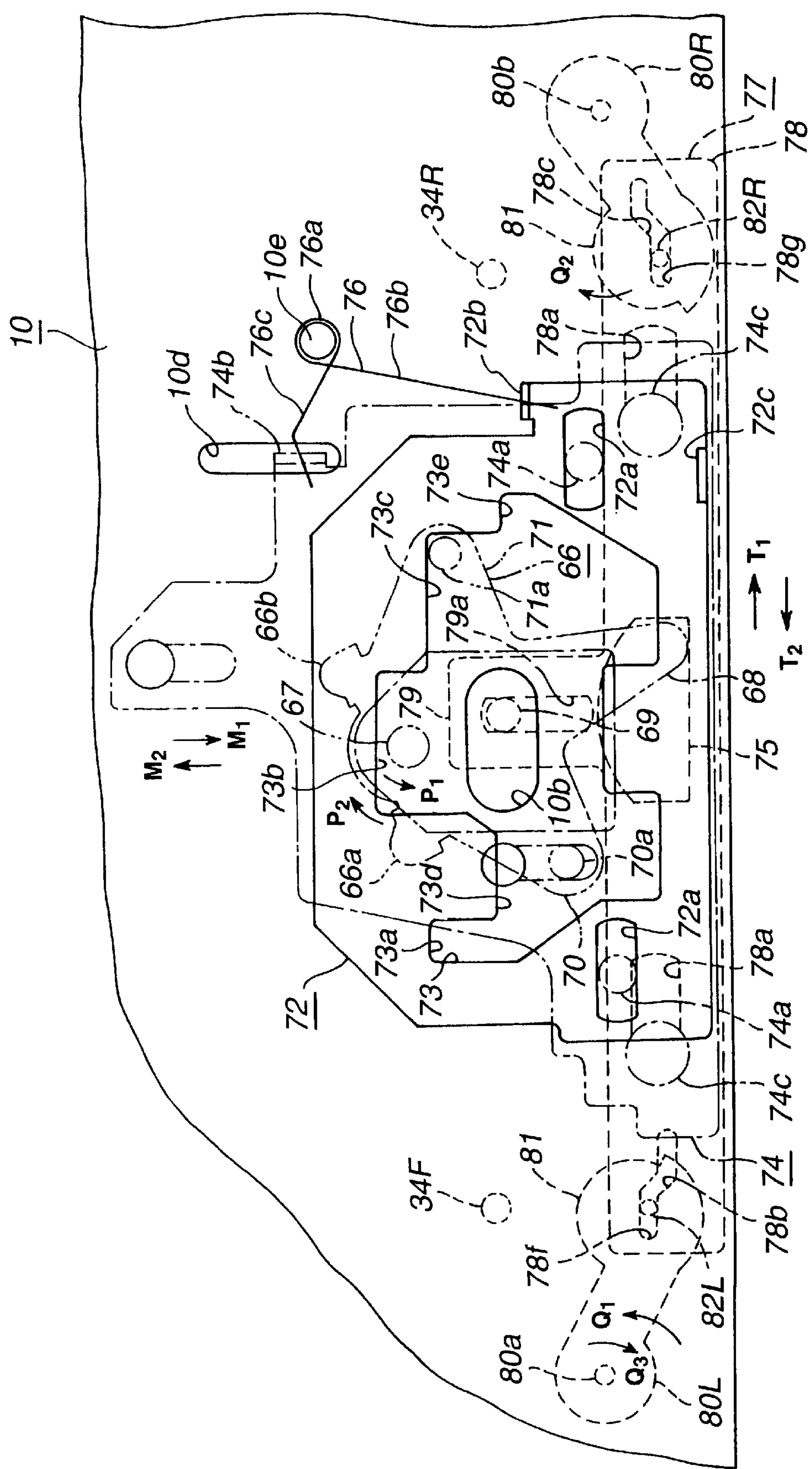

At this time, as shown in FIG. 27, the operation lever 66 is still kept rotated in the anti-clockwise direction in the direction of the arrow $P_1$ in FIG. 27, and therefore, the slide base 77 is moved in the direction of the arrow $T_1$ in FIG. 27. However, if the power is turned on again and the drive motor 31 is driven, the mode switch lever 49 is moved such that the operation lever 66 is returned to the initial position, the slide base 77 is moved in the direction of the arrow $T_2$ in FIG. 27 in accordance with rotation of the operation lever 66 and is positioned to the original position, i.e., to the center in the movement range, as shown in FIG. 30.

Figure 30:
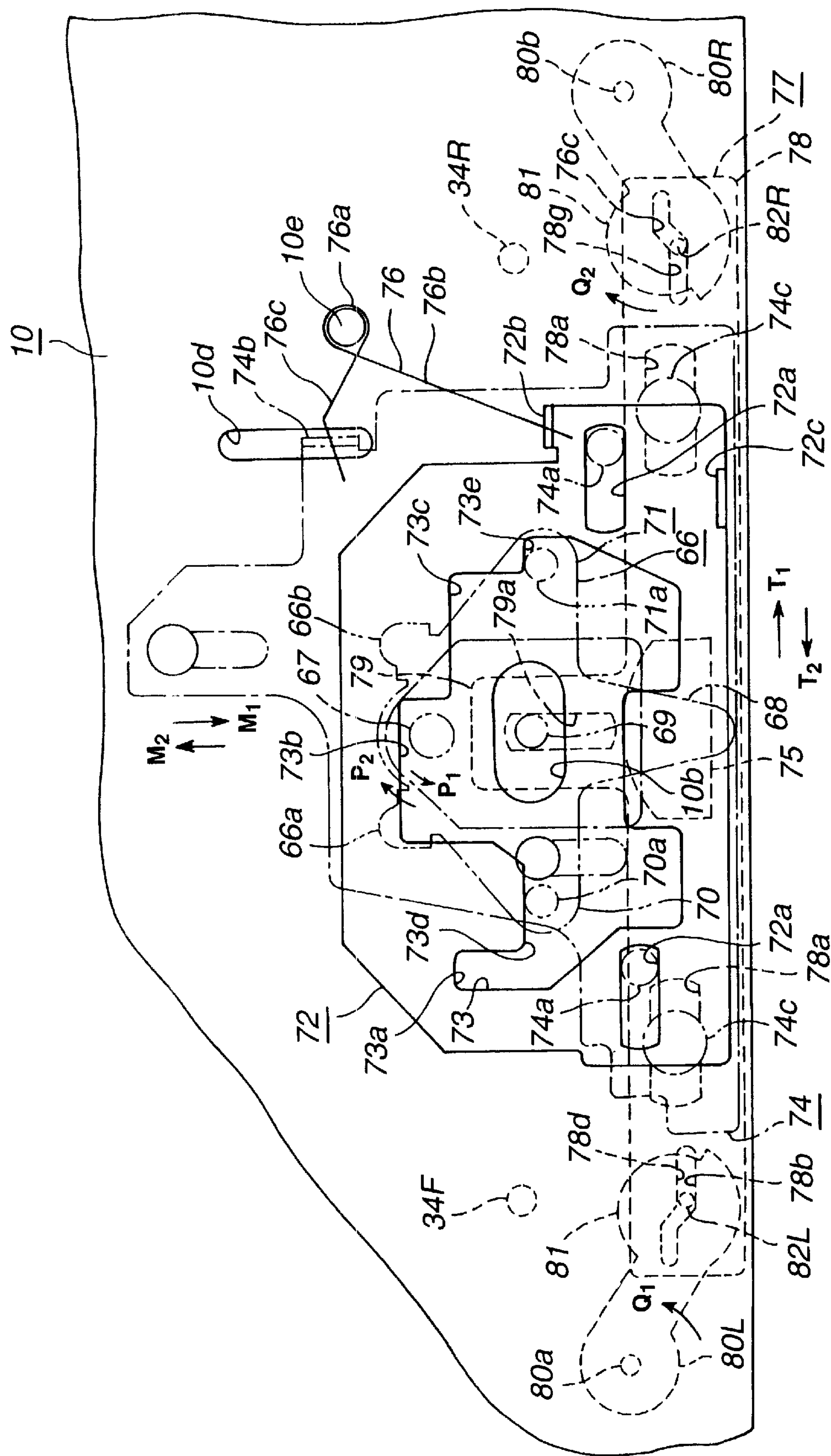

Simultaneously, since the operation lever 66 is rotated to the initial position, the second pressure projection 71*a* is moved from the second setting portion 73*c* to the position corresponding to the second pressed portion 73*e,* so the lock base 72 is moved in the direction of the arrow $N_1$ in FIG. 30 by the spring force of the torsion coil spring 76 and reaches the initial position. In this manner, the operation lever 66, the lock base 72, the head base 74, and the slide base 77 are returned to their own original states, as shown in FIG. 30.

Next explanation will be made of the operation of performing forced release when the tape player 1 according to the present invention is in the REV reproducing mode, with reference to FIGS. 28, 29, and 30.

When the tape player 1 is in the REV reproducing mode, the operation lever 66 is rotated in the clockwise direction in the direction of the arrow $P_2$ in FIG. 28, and the first pressure projection 70*a* presses the first pressed portion 73*d* of the lock base 72 in the direction of the arrow $M_2$ in FIG. 28,. so the lock base 72 is moved in the direction of the arrow $M_2$ in FIG. 28 against the energizing force of the torsion coil spring 76. Further, in accordance with the movement of the lock base 72 in the direction of the arrow $M_2$ in FIG. 28, the head base 74 is moved in the direction of the arrow $M_2$ in FIG. 28, and the magnetic head 75 attached to the head base 74 is in contact with the magnetic tape 4 of the tape cassette 5. At this time, a part of the magnetic head 75 is kept inserted in the tape cassette 5 although not shown in the figures.

Also, in accordance with the movement of the head base 74 in the direction of the arrow $M_2$ in FIG. 26, the slide base 77 together with the head base 74 is moved in the same direction of the arrow $M_2$ in FIG. 26 and is also moved in the direction of the arrow $T_2$ in FIG. 28 by the rotation of the operation lever 66 in the direction of the arrow $P_1$ in FIG. 26. As the slide base 77 moves in the direction of the arrow $T_2$ in FIG. 28, the pinch roller 81 supported on the second pinch roller support arm 80R is pressed into contact with the REV capstan 34F, thereby pinching the magnetic tape 4.

In order to extract the tape cassette 5 from the attachment section 6 when the power source is shut off, for example, due to empty battery or the like during this REV reproducing operation in which the REV reproducing mode is operated, the release knob 13 is operated to open the cover member 3 like in the case of the FWD reproducing mode.

That is, the release knob 13 provided on the upper cabinet half 7 is operated and moved in the direction of the arrow $B_1$ in FIG. 3. The release knob 13 is thus operated and moved in the direction of the arrow $B_1$ in FIG. 3, the lock of the cover member 3 is released as described above, and the cover member 3 is rendered rotatable in the direction in which the attachment section 6 formed in the body section 2 is opened. Also, when the release knob 13 is operated and moved in the direction of the arrow $B_1$ in FIG. 3, the pressure piece 24*b* of the connection plate 18 of the lock mechanism 15 connected with the release knob 13 presses the pressed piece 72*c* of the lock base 72 toward the right side in the direction of the arrow $N_2$ in FIGS. 20 and 28. The pressed piece 72*c* is pressed in the direction of the arrow $N_2$ in FIG. 28 by the pressure piece 24*b,* so the lock base 72 is moved in the same direction against the energizing force of the torsion coil spring 76. As the lock base 72 moves to the right side in the direction of the arrow $N_2$ in FIG. 28, the first pressed portion 73*d* which has been in contact with the first pressure projection 70*a* of the operation lever 66 slides on the pressure projection 70*a* and relatively moves to the left side in the direction of the arrow $N_1$ in FIG. 28. When the pressed portion 73*d* has come to correspond to the first setting portion 73*a,* this slidable contact is released, so the lock base 72 is moved in the direction of the arrow $M_1$ in FIG. 28 by the spring force of the torsion coil spring 76. As shown in FIG. 29, the first pressure projection 70*a* is positioned in the first setting portion 73*a* of the opening portion 73 of the lock base 72.

In accordance with the movement of the lock base 72 in the direction of the arrow $M_1$ in FIG. 28, the head base 74 is moved in the same direction, and the magnetic head 75 attached to the head base 74 is moved in the direction in which the head is moved apart from the magnetic tape 4, to return back from the cassette 5. At this time, the slide base 77 together with the bead base 74 moves in the direction of the arrow $M_1$ in FIG. 28, and the second pinch roller support arm 80L is rotated in the direction in which this arm is moved apart from the REV capstan 34R in the direction of the arrow $Q_4$ in FIG. 28, so the pinch roller 81 supported on the second pinch roller support arm 80R is moved apart from the REV capstan 34R thereby releasing the pinching of the magnetic tape 4.

In this state, by rotating the cover member 3 to the position where the attachment section 6 is opened, the tape cassette 5 attached to the attachment section 6 can be extracted.

Figure 29:
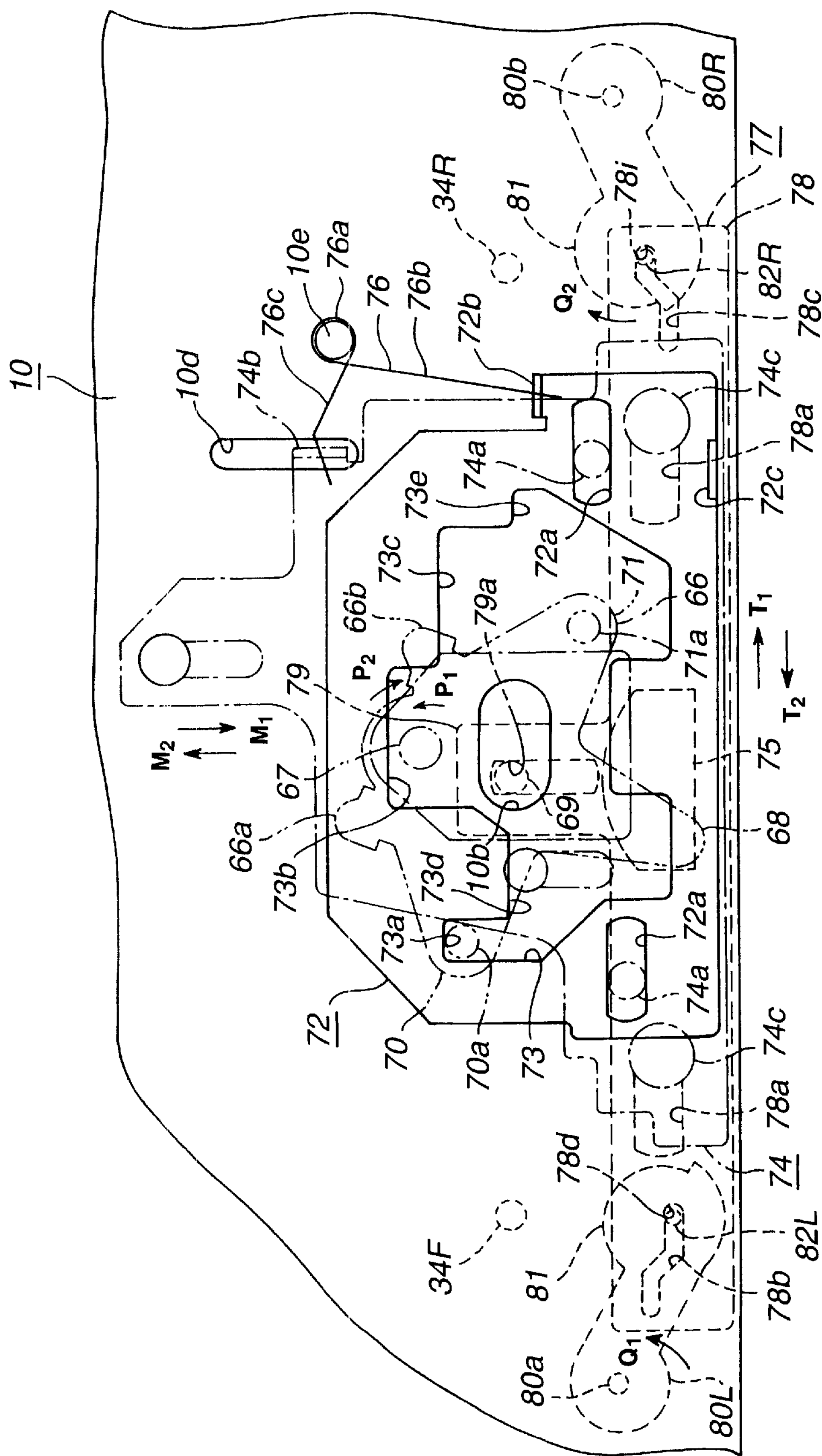

At this time, as shown in FIG. 29, the operation lever 66 is still kept rotated in the anti-clockwise direction in the direction of the arrow $P_1$ in FIG. 29, and therefore, the slide base 77 is moved in the direction of the arrow $T_2$ in FIG. 29. However, if the power is turned on again and the drive motor 31 is driven, the mode switch lever 49 is moved such that the operation lever 66 is returned to the initial position, the slide base 77 is moved in the direction of the arrow $T_1$ in FIG. 29 in accordance with rotation of the operation lever 66 and is positioned to the original position, i.e., to the center in the movement range, as shown in FIG. 30.

Simultaneously, since the operation lever 66 is rotated to the initial position, the first pressure projection 71 is moved from the first setting portion 73*a* to the position corresponding to the first pressed portion 73*d*, so the lock base 72 is moved in the direction of the arrow $N_1$ in FIG. 30 by the spring force of the torsion coil spring 76 and reaches the initial position. In this manner, the operation lever 66, the lock base 72, the head base 74, and the slide base 77 are returned to their own original states, as shown in FIG. 30.

Thus, every time when the power supply is stopped while the FWD reproducing mode or the REV reproducing mode is set and the cover member 3 is opened by operating the release knob 13 while the FWD reproducing mode or the REV reproducing mode is set, insertion of the magnetic head 75 in the tape cassette 5 is released, so the first pinch roller support arm 80L or the second pinch roller support arm 80R is rotated to the position distant from the FWD capstan 34F or the REV capstan 34R, thereby enabling the release of the pinching of the magnetic tape 4 by the pinch rollers 81 and the FWD capstan 34F or the REV capstan 34R. Therefore, the tape cassette 5 attached to the attachment section 6 and the magnetic tape 4 contained in the tape cassette 5 can be safely extracted without contacting the magnetic head 75, the first pinch roller support arm 80L, and the like. Accordingly, respective members such as the magnetic head 75 and the like provided in the tape player 1 and the tape cassette 5 can be securely protected.

Also, in the tape player 1 according to the present invention, since the tape cassette 5 can be extracted from the attachment section 6 without turning on the power again, the operability can be improved. In particular, in a portable tape player using a battery as a power source, the tape cassette 5 can be extracted without replacing the battery even when the battery becomes empty, so the operability can be improved more.

In the embodiment described above, explanation has been made with reference to an example in which the present invention is applied to a playback-only tape player. However, the advantages described above can be attained by applying the present invention to a recording and/or reproducing apparatus which uses a magnetic tape as a recording medium.

Industrial Applicability

In the recording and/or reproducing apparatus for a magnetic tape, according to the present invention, when holding by a holding mechanism is released at the position where a cover member is closed in a state where a magnetic head moved between a contact position where contact with a magnetic tape which travels by a traveling mechanism provided in the apparatus body is obtained and a position distant from the magnetic tape or in a state where the magnetic tape is pinched by the traveling mechanism, the state of pinching the magnetic tape by the traveling mechanism is released and the magnetic head is moved to a distant position. Therefore, even if the apparatus is stopped when the power source is shut off while the FWD reproducing mode or the rev reproducing mode is kept set, the magnetic tape can be safely and securely extracted from the attachment section.

What is claimed is:

1. A recording and reproducing apparatus for a magnetic tape, comprising;

an apparatus body on which the magnetic tape is mounted;

a cover member provided on the apparatus body such that the cover member is opened and closed to open and close a portion of the apparatus body where the magnetic tape is mounted;

a tape traveling mechanism provided on the apparatus body for pinching the magnetic tape and moving the pinched magnetic tape;

a holding and releasing mechanism for holding the cover member at a closed position and for releasing the cover member upon actuation by a user, whereby the magnetic tape remains mounted on the tape traveling mechanism;

a magnetic head provided on the apparatus body, so as to be moveable between a contact position where the magnetic head is in contact with the magnetic tape and a distant position where the magnetic head is distant from the magnetic tape; and switch means connected to the holding and releasing mechanism, the tape traveling mechanism, and the magnetic head wherein in a state having the magnetic tape pinched by the tape traveling mechanism, the magnetic head in the contact position, and the cover member at the closed position, when the cover member is released from the closed position and moved to an opened position by actuation of the holding and releasing mechanism by the user, the pinching of the magnetic tape by the tape traveling mechanism is released and the magnetic head is moved to the distant position, and wherein the magnetic tape is not ejected and remains mounted on the tape traveling mechanism.

2. The recording and reproducing apparatus according to claim 1, wherein the traveling mechanism comprises:

at least one capstan; and a pinch roller for pinching, together with the capstan, the magnetic tape and for moving the magnetic tape, wherein the switch means releases the pinching of the magnetic tape by the pinch roller together with the capstan.

3. The recording and reproducing apparatus according to claim 1, further comprising:

a plurality of operation sections for switching a traveling state of the magnetic tape and a recording and reproducing state of the magnetic tape, wherein the switch means moves the magnetic head to one of the contact position and the distant position and switches the traveling mechanism into a state in which the magnetic tape is pinched, such that any of the plurality of operation sections is operated.

4. The recording and reproducing apparatus according to claim 3, further comprising:

a motor started as the operation sections are operated, wherein the switch means further comprises a mode switch lever moved and operated, based on a drive force from the motor, and the magnetic head and the traveling mechanism are operated by the mode switch lever.

5. The recording and reproducing apparatus according to claim 4, wherein the traveling mechanism comprises:

at least on capstan; and a pinch roller for pinching, together with the capstan, the magnetic tape and for moving the magnetic tape, wherein the switch means releases the pinching of the magnetic tape by moving the pinch roller away from the capstan.

6. The recording and reproducing apparatus according to claim 5, wherein the switch means comprises:

a first movement operation section for moving the magnetic head between the contact position and the distant position by the mode switch lever; and a second movement operation section for moving the pinch roller to a position where the pinch roller together with the capstan pinch the magnetic tape.

7. The recording and reproducing apparatus according to claim 4, further comprising:

a pair of reel bases;

a detection switch for detecting a position of the mode switch lever; and a drive mechanism for driving one of the pair of reel bases, based on the drive force of the motor, wherein, based on a detection result of the detection switch, a rotation direction of the motor is switched thereby to switch the one of the reel bases driven by the drive mechanism.

8. A recording and reproducing apparatus for a magnetic tape, comprising:

an apparatus body on which the magnetic tape is mounted;

a cover member provided on the apparatus body such that the cover member is opened and closed to open and close a portion of the apparatus body where the magnetic tape is mounted;

a tape traveling mechanism provided on the apparatus body for pinching the magnetic tape and moving the pinched magnetic tape;

a holding and releasing mechanism for holding the cover member at a closed position and for releasing the cover member upon actuation by a user, whereby the magnetic tape remains mounted on the tape traveling mechanism;

a magnetic head provided on the apparatus body, moveable between a contact position where the magnetic head is in contact with the magnetic tape and a distant position where the magnetic head is distant from the magnetic tape;

a motor for driving the traveling mechanism to move the tape; and switch means connected to the holding and releasing mechanism, the tape traveling mechanism, and the magnetic head, wherein in a state having the magnetic head in the contact position, the magnetic tape pinched by the tape traveling mechanism, a supply of power to the motor is shut off, and the cover at the closed position when the cover member is moved to an open position by actuation of the holding and releasing mechanism by the user, the pinching of the magnetic tape by the traveling mechanism is released and the magnetic head is moved to the distant position, and wherein the magnetic tape is not ejected remains mounted on the tape traveling mechanism, even when the motor is shut off.

9. The recording and reproducing apparatus according to claim 8, wherein the traveling mechanism comprises:

at least one capstan driven by the motor; and a pinch roller for pinching, together with the capstan, the magnetic tape and for moving the magnetic tape wherein the switch means releases the pinching of the magnetic tape by the pinch roller together with the capstan.

10. The recording and reproducing apparatus according to claim 8, further comprising a plurality of operation sections for switching a traveling state of the magnetic tape and a recording and reproducing state of the magnetic tape, wherein the switch means moves the magnetic head to one of the contact position and the distant position and switches the traveling mechanism into a state in which the magnetic tape is pinched, such that any of the plurality of operations sections is operated.

11. The recording and reproducing apparatus according to claim 10, wherein the switch means further comprises:

a mode switch lever moved and operated based on the drive force from the motor, wherein the magnetic head and the traveling mechanism are operated by the mode switch lever.

12. The recording and reproducing apparatus according to claim 11, wherein the traveling mechanism comprises:

at least one capstan driven by the motor; and a pinch roller for pinching, together with the capstan, the magnetic tape and for moving the magnetic tape wherein the switch means releases the pinching of the magnetic tape by the pinch roller together with the capstan.

13. The recording and reproducing apparatus according to claim 12, wherein the switch means comprises:

a first movement operation section for moving the magnetic head between the contact position and the distant position by the mode switch lever; and a second movement operation section for moving the pinch roller to a position where the pinch roller together with the capstan pinch the magnetic tape.

14. The recording and reproducing apparatus according to claim 13, wherein the switch means causes the holding and release mechanism to recover an initial position when power is supplied again to the motor.

15. The recording and reproducing apparatus according to claim 11, further comprising:

a pair of reel bases;

a detection switch for detecting a position of the mode switch lever; and a drive mechanism for driving one of the pair of reel bases, based on the drive force of the motor, wherein based on a detection result of the detection switch, a rotation direction of the motor is switched thereby to switch the one of the reel bases driven by the drive mechanism.

* * * * *